United States Patent Office 3,075,978
Patented Jan. 29, 1963

3,075,978
PROCESS FOR MAKING AMINO-ALKYL-PARA AMINO-ORTHO SUBSTITUTED-BENZOIC ACID ESTERS AND AMIDES
Merrill E. Speeter, Kalamazoo Township, Kalamazoo County, Mich., assignor to The Upjohn Company, Kalamazoo, Mich., a corporation of Michigan
No Drawing. Filed May 24, 1954, Ser. No. 432,033
2 Claims. (Cl. 260—247.1)

This invention relates to a process for preparing benzoic acid derivatives and to novel products thereof. More particularly, the invention relates to a process for preparing hindered 4-aminobenzoic acid derivatives and to novel hindered 4-aminobenzoic acid derivatives so produced.

Esters of 4-aminobenzoic acid are known to have valuable therapeutic properties, especially as local anesthetics. Thus, β-diethylaminoethyl 4-aminobenzoate, commonly known as procaine, is particularly useful as a local anesthetic. These esters, however, have the disadvantage of being relatively easily hydrolyzed. It has been found that this disadvantage is largely avoided if the carboxylate group is hindered, i.e., if at least one of the carbon atoms ortho to the carboxylate group in the 1-position bears a substituent such as $R_1$ or $R_2$, as set forth in greater detail hereinafter. Thus, 2,6-dimethylprocaine, for example, is more stable to hydrolysis than procaine. This and other hindered 4-aminobenzoic acid derivatives, however, cannot be prepared by the methods known for the preparation of procaine.

Furthermore, by the novel procedure of the invention, new and therapeutically useful hindered 4-aminobenzoic acid derivatives which were unavailable hitherto are prepared.

It is an object of the invention, therefore, to provide a new process for the preparation of hindered 4-aminobenzoic acid derivatives. Another object of the invention is to provide new and novel hindered 4-aminobenzoic acid derivatives. Other objects and features of the invention will be apparent to those skilled in the art to which this invention pertains.

These objects are accomplished in the present invention by subjecting a hindered 4-oxo-2-cyclohexene-1-carboxylic acid ester to oximation; aromatizing and acylating the resulting hindered 4-oximino-2-cyclohexene-1-carboxylic acid ester; hydrolyzing the resulting hindered 4-acylamidobenzoic acid ester followed by acylation to obtain a hindered 4-acylamidobenzoic acid; reacting the hindered 4-acylamidobenzoic acid with an inorganic acid halide to obtain a hindered 4-acylamidobenzoyl halide, reacting the hindered 4-acylamidobenzoyl halide with a compound of the formula:

$$HYC_nH_{2n}R$$

wherein Y is a member selected from the group consisting of oxygen, sulfur, imino, and lower-alkylimino, R is a secondary-amino radical, and $n$ is an integer from one to six inclusive, to obtain a hindered 4-acylamidobenzoic acid compound; and hydrolyzing said compound to form the corresponding hindered 4-aminobenzoic acid compound.

The term "secondary-amino radical" as used in the specification and claims refers to a radical obtained by removing the hydrogen atom attached to the nitrogen atom of a secondary amine.

In accordance with a specific embodiment of the process of the invention, a hindered 4-oxo-2-cyclohexene-1-carboxylic acid ester is converted to its oxime by any suitable procedure. Ordinarily, this is conveniently accomplished by reacting the 4-oxo group with a hydroxylamine salt such as hyroxylamine hydrochloride, hydroxylamine sulfate, and the like, in a suitable solvent such as a pyridine-alcohol solution, to form the corresponding hindered 4-oximino-2-cyclohexene-1-carboxylic acid ester. Solvents other than pyridine can be used in the reaction such as, for example, a lower-alkyl pyridine, quinoline, isoquinoline, and the like. The conversion of the hindered 4-oxo-2-cyclohexene-1-carboxylic acid ester to the corresponding hindered 4-oximino-2-cyclohexene-1-carboxylic acid ester may likewise be effected by reacting the ketone with a hydroxylamine salt in alcohol in the presence of an acid-binding agent such as sodium acetate, potassium acetate, lithium propionate, and the like.

The hindered 4-oximino-2-cyclohexene - 1 - carboxylic acid ester is then aromatized and acylated to form the corresponding hindered 4-acylamidobenzoic acid ester. This is preferably accomplished in an acidic medium containing an anhydride of a lower-aliphatic acid such as acetic, propionic, butyric, and isobutyric anhydride, and the like; a hydrogen halide such as hydrogen chloride or hydrogen bromide; and a lower-aliphatic acid such as acetic acid, propionic acid, butyric acid, isobutyric acid, and the like. In this reaction, it is ordinarily preferable to use an acid together with its anhydride. For example, if acetic anhydride is used, acetic acid is preferred and likewise, if propionic anhydride is used, propionic acid is preferred. While aromatization and acylation of the hindered 4-oximino-2-cyclohexene-1-carboxylic acid ester can be effected in the absence of a lower-aliphatic acid, superior results are obtained when a lower-aliphatic acid is present in the reaction mixture. Further, although concentration of the acylating agent may be varied, at least an equimolar amount of the acylating agent with respect to the starting material is employed and preferably, a molar ratio between about 3:1 and about 8:1. At least one mole of the lower-aliphatic acid must be present to secure optimum results. Still further, highly satisfactory results are obtained when the reaction mixture is substantially saturated with the hydrogen halide. It is ordinarily preferred to maintain the temperature of the reaction between about 100 degrees and about 120 degrees centigrade although temperatures between about sixty degrees centigrade and about 200 degrees centigrade can also be utilized. The reaction mixture is heated for a period of at least one hour. Upon completion of the reaction, the mixture is worked up by any convenient procedure. Advantageously, the reaction mixture is added to ice or water, and the hindered 4-acylamidobenzoic acid ester is recovered and recrystallized from a suitable solvent.

Alternatively, aromatization and acylation can likewise be effected by reacting a pyridine solution of the starting hindered 4-oximino-2-cyclohexene-1-carboxylic acid ester with a solution containing an equimolar quantity of a lower-aliphatic acid halide dissolved in a lower-aliphatic acid anhydride, at a temperature between about fifty degrees and about 100 degrees centigrade. When the reaction moderates, the mixture is refluxed for at least one hour. After reflux, the mixture is poured into water or ice and worked up, for example, by the aforedescribed conventional procedure, to obtain the desired 4-acylamidobenzoic acid ester.

The hindered 4-acylamidobenzoic acid ester is hydrolyzed, i.e., deacylated and de-esterified, and then acylated. This ordinarily involves hydrolysis of both the ester function and the 4-acylamido group, followed by acylation of the resulting 4-amino group to reconstitute the 4-acylamido group. The acyl group in the resulting 4-acylamidobenzoic acid, therefore, may or may not be the same as that of the starting hindered 4-acylamidobenzoic acid ester. It has been found advantageous to effect the hydrolysis by heating the 4-acylamidobenzoic acid ester at a temperature between about 125 degrees and about 200 degrees centigrade, in a mixture containing an alkali such as potassium hydroxide, sodium hydroxide, and the like, and a glycol such as ethylene glycol, propylene glycol, and the like; and to effect acylation of the hydrolyzed compound in the presence of water, at a temperature between about zero degrees centigrade and about 75 degrees centigrade, by reaction with an acylating agent such as an anhydride of a lower-aliphatic acid, e.g., acetic anhydride, propionic anhydride, butyric anhydride and the like; an arylsulfonyl halide such as tosyl chloride, tosyl bromide, benzenesulfonyl chloride, and the like; or an aroyl halide such as benzoyl chloride, benzoyl bromide, and the like. In the hydrolysis reaction, between about three and about ten moles of alkali per mole of starting 4-acylamidobenzoic acid ester are preferred, although satisfactory results are likewise obtained by the use of larger amounts of alkali such as up to about fifteen or even about twenty moles of alkali per mole of starting 4-acylamidobenzoic acid ester. The reaction temperature should not substantially exceed 200 degrees centigrade to prevent decarboxylation of the hindered 4-acylamidobenzoic acid product. In the acylation reaction, at least one mole of acylating agent per mole of ester is used, although ordinarily, an excess will be used such as from about five to about ten moles of acylating agent per mole of ester. The acylating agent can be present in the mixture in equimolar amounts with the alkali material used. Upon completion of the reaction, the mixture is worked up by any convenient procedure. Advantageously, a mineral acid is added, the hindered 4-acylamidobenzoic acid is extracted with a suitable solvent, e.g., ether, the solvent is evaporated, the residue is extracted with caustic solution to obtain a water solution of a salt of the organic acid, and this solution is acidified to precipitate the free organic acid. The latter can be further purified if so desired, such as by recrystallization from a suitable solvent.

Deacylation of the hindered 4-acylamidobenzoic acid ester can likewise be accomplished in other ways such as by reaction with a dilute alkali for a short period of time, i.e., about four hours, or by alcoholysis, or ammonolysis, the alcoholysis and ammonolysis reactions being conducted at temperatures in excess of 100 degrees centigrade for periods of time varying between ten and 48 hours. On deacylating the hindered 4-acylamidobenzoic acid ester, the hindered 4-aminobenzoic acid ester is obtained. This compound is then hydrolyzed by conventional means to the corresponding hindered 4-aminobenzoic acid and the acid is acylated to obtain a hindered 4-acylamidobenzoic acid. Acylating agents which can be used include anhydrides of lower-aliphatic acids such as acetic anhydride, propionic anhydride, butyric anhydride, isobutyric anhydride, and the like; arylsulfonyl halides such as tosyl chloride, tosyl bromide, benzenesulfonyl chloride, and the like; and aroyl halides such as benzoyl chloride, benzoyl bromide, and the like.

The hindered 4-acylamidobenzoic acid thus obtained is converted to an acid halide by reaction with an inorganic acid halide such as thionyl chloride, thionyl bromide, phosphorus trichloride, phosphorus pentachloride, phosphorus tribromide, phosphorus pentabromide, and the like. The conversion of the hindered 4-acylamidobenzoic acid to the acid halide can be accomplished by any of the conventional procedures for forming acyl halides, e.g., in the presence of an inert solvent such as benzene, toluene, and the like. Ordinarily, the hindered 4-acylamidobenzoyl halide is obtained sufficiently pure for reaction purposes merely by removing the inert solvent, although if desired, further purification can be effected by conventional procedures such as vacuum distillation or recrystallization.

The resulting hindered 4-acylamidobenzoyl halide is reacted with a compound of the formula:

$$HYC_nH_{2n}R$$

wherein Y, R and $n$ are as defined above. The reaction of the hindered 4-acylamidobenzoyl halide with a secondary-amino alkylamine, or a secondary-amino alkanol, or a secondary-amino alkyl mercaptan, is similar to the reaction of an alkyl amine, alkanol, or alkyl mercaptan with an acyl halide. Preferably, the reaction is conducted between about zero degrees centigrade and about forty degrees centigrade in the presence of an inert solvent such as benzene, toluene, and the like. Upon completion of the reaction, the resulting 4-acylamidobenzoic acid compound is isolated by removal of the solvent, and can be further purified by conventional means e.g., vacuum distillation.

The hindered 4-acylamidobenzoic acid compound thus obtained is then selectively hydrolyzed to the corresponding hindered 4-aminobenzoic acid compound by reaction with an alkali such as sodium hydroxide, potassium hydroxide, and the like, in a solvent such as a mixture of water with a lower-aliphatic alcohol, e.g., methyl alcohol, ethyl alcohol, propyl alcohol, and the like, or with a water-soluble ketone such as acetone, methyl ethyl ketone, and the like. The hydrolysis is carried out at a temperature between about forty degrees centigrade and about 100 degrees centigrade, preferably between about fifty degrees centigrade and about 85 degrees centigrade, and for a time between about one hour and about six hours, preferably between about two hours and about four hours. From about one to about eight moles of alkali, and preferably from about two to about six moles, are employed per mole of starting 4-acylamidobenzoic acid compound. In this hydrolytic reaction, care must be taken that hydrolysis of the amide group in the 4-position is effected without any substantial hydrolysis of the ester group in the 1-position. Thus, when a higher reaction temperature, e.g., 100 degrees centigrade is employed, and/or a higher molar ratio of alkali to starting amide-ester, e.g., 8:1, is employed, a correspondingly shorter reaction time is employed, all of which will be readily apparent to one skilled in the art.

When an arylsulfonyl halide or aroyl halide has been used as the acylating agent, the corresponding hindered 4-acylamidobenzoic acid compound can be hydrolyzed by reaction with a mixture of hydrogen bromide and phenol in an acetic acid medium, by the procedure set forth in U.S. Patent 2,562,222, to form the hindered 4-aminobenzoic acid compound.

The process for the preparation of hindered 4-aminobenzoic acid derivatives is set forth in the following equations:

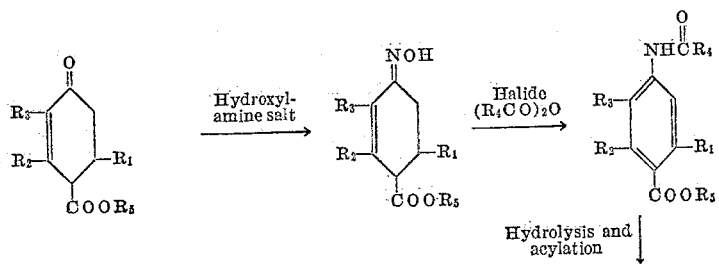

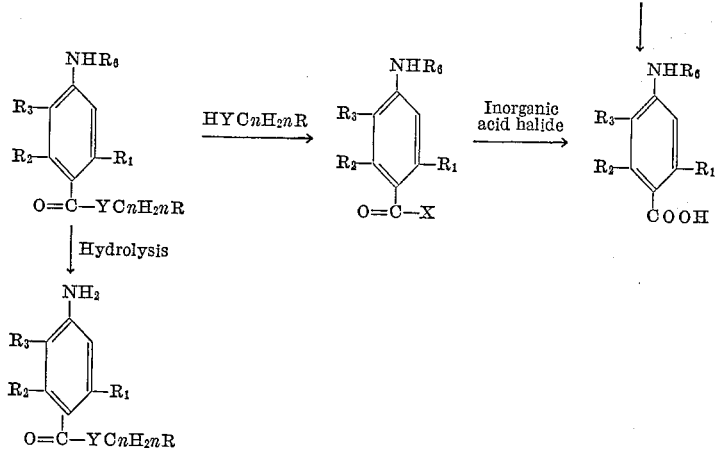

wherein $n$ is an integer from one to six inclusive, R is a secondary amino radical, $R_1$ is a member selected from the group consisting of hydrogen and alkyl, cycloalkyl, aralkyl, aryl and heterocyclic radicals; $R_2$ is a member selected from the group consisting of alkyl and aryl radicals; $R_3$ is a member selected from the group consisting of hydrogen and alkyl and aralkyl radicals; $R_4$ is an alkyl radical; $R_5$ is a member selected from the group consisting of alkyl and aralkyl radicals; $R_6$ is an acyl radical; X is halogen; and Y is a member selected from the group consisting of oxygen, sulfur, imino and alkylimino.

Examples of alkyl radicals are methyl, ethyl, propyl, butyl, amyl, hexyl, heptyl, octyl, and the like, including isomeric forms thereof. Cycloalkyl radicals include unsubstituted and substituted radicals such as cyclopropyl, cyclobutyl, cyclopentyl, cyclohexyl, cycloheptyl, cyclooctyl, methylcyclohexyl, dimethylcyclohexyl, ethylcyclohexyl, amylcyclohexyl, hexylcyclohexyl, methylcyclobutyl, methylcyclopentyl, methylcyclooctyl, and the like, including isomeric forms thereof. Aralkyl radicals include unsubstituted and substituted radicals such as benzyl, phenethyl, phenylpropyl, methoxyphenethyl, and the like, including isomeric forms thereof. Aryl radicals include unsubstituted and substituted radicals such as phenyl, naphthyl, methoxyphenyl, butoxyphenyl, methoxynaphthyl, chlorophenyl, bromonaphthyl, tolyl, xylyl, trimethylphenyl, ethylphenyl, amylphenyl, methylbutylphenyl, methylnaphthyl, butylnaphthyl, di- and trimethylnaphthyl, dichlorophenyl, dimethoxyphenyl, methoxychlorophenyl, and the like, including isomeric forms thereof. Examples of heterocyclic radicals are furyl, thienyl, pyridyl, and the like, including isomeric forms thereof. Examples of acyl radicals are acetyl, propionyl, butylryl, tosyl, benzenesulfonyl, benzoyl, and the like, including isomeric forms thereof. Examples of halogens are chlorine, bromine, and the like.

The starting materials of the invention, i.e., esters of hindered 4-oxo-2-cyclohexene-1-carboxylic acids, are represented by the following formula:

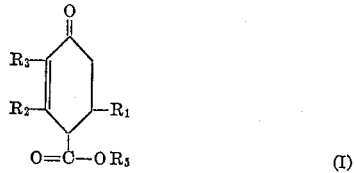

(I)

wherein $R_1$, $R_2$, $R_3$ and $R_5$ are as defined above, and include, for example:

Methyl, ethyl, n-propyl, isopropyl, n-butyl, sec-butyl, n-amyl, 1-ethylbutyl, benzyl, and phenethyl 2-methyl-4-oxo-2-cyclohexene-1-carboxylates,
Ethyl 2-ethyl-4-oxo-2-cyclohexene-1-carboxylate,
Methyl 2-n-propyl-4-oxo-2-cyclohexene-1-carboxylate,
Methyl, benzyl, and phenethyl 2,6-dimethyl-4-oxo-2-cyclohexene-1-carboxylates,
Methyl, ethyl, benzyl, and phenethyl 2-methyl-6-ethyl-4-oxo-2-cyclohexene-1-carboxylates,
Methyl, ethyl, and benzyl 2-methyl-6-isopropyl-4-oxo-2-cyclohexene-1-carboxylates,
Methyl, ethyl, and benzyl 2,6-diethyl-4-oxo-2-cyclohexene-1-carboxylates,
Ethyl 2-methyl-6-n-hexyl-4-oxo-2-cyclohexene-1-carboxylate,
Ethyl 2-methyl-6-phenyl-4-oxo-2-cyclohexene-1-carboxylate,
Ethyl 2-methyl-6-(2-furyl)-4-oxo-2-cyclohexene-1-carboxylate,
Ethyl 2-methyl-6-cyclobutyl-4-oxo-2-cyclohexene-1-carboxylate,
Methyl 2-methyl-6-cyclohexyl-4-oxo-2-cyclohexene-1-carboxylate,
Ethyl 2-methyl-6-o-methylbenzyl-4-oxo-2-cyclohexene-1-carboxylate,
Ethyl 2-methyl-6-p-methoxyphenethyl-4-oxo-2-cyclohexene-1-carboxylate,
Ethyl 2,6-diphenyl-4-oxo-2-cyclohexene-1-carboxylate,
Ethyl 2,6-diphenyl-3-ethyl-4-oxo-2-cyclohexene-1-carboxylate,
Ethyl 2,3-dimethyl-4-oxo-2-cyclohexene-1-carboxylate,
Ethyl 2-methyl-3-benzyl-6-isopropyl-4-oxo-2-cyclohexene-1-carboxylate,
Methyl 2,3,6-trimethyl-4-oxo-2-cyclohexene-1-carboxylate,
Ethyl 2-methyl-3-ethyl-4-oxo-2-cyclohexene-1-carboxylate,
Ethyl 2-methyl-3-(3,7-dimethyloctyl)-4-oxo-2-cyclohexene-1-carboxylate,
Ethyl 2-methyl-3-m-methoxyphenethyl-4-oxo-2-cyclohexene-1-carboxylate,
Ethyl 2-methyl-3-ethyl-6-isopropyl-4-oxo-2-cyclohexene-1-carboxylate,
Ethyl 2-ethyl-3-methyl-4-oxo-2-cyclohexene-1-carboxylate,
Ethyl 2-methyl-6-p-tolyl-4-oxo-2-cyclohexene-1-carboxylate,
Ethyl 2-methyl-6-benzyl-4-oxo-2-cyclohexene-1-carboxylate,
Ethyl 2-methyl-3-benzyl-4-oxo-2-cyclohexene-1-carboxylate, and the like.

The esters of hindered 4-oxo-2-cyclohexene-1-carboxylic acids which are used as starting materials in the synthesis of the novel compounds of the invention are prepared by various known methods.

For example, in one method, Knoevenagel condensation conditions are employed to react aldehydes (e.g., formaldehyde, acetaldehyde, phenylacetaldehyde, isobutyraldehyde, furfural, hexahydrobenzaldehyde, and the like) with esters of β-keto alkanoic acids (e.g., ethyl acetoacetate, butyl acetoacetate, methyl acetoacetate, benzyl acetoacetate, ethyl propionylacetate, ethyl isobutyrylacetate, and the like) to form esters of α,α'-diacylglutaric acids. These "bis-esters," so-called, are then cyclized in various ways, e.g., with sulfuric acid and acetic acid, to produce esters of hindered 4-oxo-2-cyclohexene-1-carboxylic acids. This general method for preparing compounds of this type has been described in the literature by Hagemann, Ber. 26, 876 (1893),
Horning, Denekas and Field, J. Org. Chem. 9, 547–551 (1944),
Horning, Denekas and Field, Org. Syntheses 27, 24–27 (1947),
L. I. Smith and Rouault, J. Am. Chem. Soc. 65, 631–635 (1943), and
W. T. Smith and Eftax, ibid. 75, 4356 (1953).

More specifically, on reacting formaldehyde with ethyl acetoacetate, ethyl 2-methyl-4-oxo-2-cyclohexene-1-carboxylate ("Hagemann's ester") is obtained; using acetaldehyde and ethyl propionylacetate as reactants, ethyl 2-ethyl 3,6-dimethyl-4-oxo-2-cyclohexene-1-carboxylate is obtained.

Similarly, other hindered 4-oxo-2-cyclohexene-1-carboxylic acid esters are obtained such as:

Ethyl 2,6-dimethyl-4-oxo-2-cyclohexene-1-carboxylate,
Ethyl 2-methyl-6-ethyl-4-oxo-2-cyclohexene-1-carboxylate,
Ethyl 2 - methyl - 6 - n - hexyl - 4 - oxo - 2 - cyclohexene-1-carboxylate,
Ethyl 2 - methyl - 6 - isopropyl - 4 - oxo - 2 - cyclohexene-1-carboxylate,
Ethyl 2 - methyl - 6 - n - propyl - 4 - oxo - 2 - cyclohexene-1-carboxylate,
Ethyl 2 - methyl - 6 - p - methoxyphenethyl - 4 - oxo - 2 - cyclohexene-1-carboxylate,
Ethyl 2,6-diethyl-4-oxo-2-cyclohexene-1-carboxylate,
Benzyl 2,6-diethyl-4-oxo-2-cyclohexene-1-carboxylate,
Phenethyl 2,6 - dimethyl - 4 - oxo - 2 - cyclohexene - 1-carboxylate,
Ethyl 2 - methyl - 6 - (2 - furyl) - 4 - oxo - 2 - cyclohexene-1-carboxylate,
Ethyl 2 - methyl - 6 - cyclohexyl - 4 - oxo - 2 - cyclohexene-1-carboxylate,
Methyl 2 - methyl - 6 - cyclohexyl - 4 - oxo - 2 - cyclohexene-1-carboxylate,
Ethyl 2 - methyl - 6 - o - methylbenzyl - 4 - oxo - 2 - cyclohexene-1-carboxylate,
Butyl 2 - methyl - 6 - benzyl - 4 - oxo - 2 - cyclohexene-1-carboxylate, and the like.

Newman and Lloyd, J. Org. Chem. 17, 577–580 (1952), utilized the diene synthesis to react 2-methoxybutadiene with ethyl 2-butynoate to produce a cyclic enol ether which was readily converted by mild hydrolysis to Hagemann's ester. Similarly, starting compounds of the present invention can likewise be prepared by this method merely by using other 2-alkynoic acid esters as reactants to obtain compounds such as ethyl 2-ethyl-4-oxo-2-cyclohexene-1-carboxylate, ethyl 2-n-propyl-4-oxo-2-cyclohexene-1-carboxylate, ethyl 2-n-butyl-4-oxo-2-cyclohexene-1-carboxylate, and the like.

To prepare esters of hindered 4-oxo-2-cyclohexene-1-carboxylic acids having aryl substituents, it is ordinarily preferred to employ procedures such as those described by Rabe and Spence, Ann. 342, 352 (1905),
Dieckmann and Von Fischer, Ber. 44, 966–974 (1911),
Dieckmann, ibid. 44, 975–981 (1911), and
Horning and Field, J. Am. Chem. Soc. 68, 387–389 (1946).

Thus, by these general procedures, esters of hindered 4-oxo-2-cyclohexene-1-carboxylic acids are obtained such as:

Ethyl 2 - methyl - 6 - p - methoxyphenyl - 4 - oxo - 2 - cyclohexene-1-carboxylate,
Ethyl 2-methyl-6-phenyl-4-oxo-2-cyclohexene-1-carboxylate,
Ethyl 2,6-diphenyl-4-oxo-2-cyclohexene-1-carboxylate,
Ethyl 2-methyl-6-p-tolyl-4-oxo-2-cyclohexene-1-carboxylate, and the like.

The esters of hindered 4-oxo-2-cyclohexene-1-carboxylic acids, the starting compounds for the process and products of the invention, wherein $R_3$ is hydrogen (Formula I, supra) are alkylated at position 3 to obtain corresponding compounds in which $R_3$ is an alkyl or aralkyl radical. Thus, for example, Hagemann's ester can be converted to ethyl 2-methyl-3-p-methoxyphenethyl-4-oxo-2-cyclohexene-1-carboxylate and ethyl 2,6-dimethyl-4-oxo-2-cyclohexene-1-carboxylate can be converted to ethyl 2,6 - dimethyl - 3 - n - butyl - 4 - oxo - 2 - cyclohexene-1-carboxylate. Suitable alkylation procedures have been disclosed by Smith and Rouault, supra,
Bergmann and Weizmann, J. Org. Chem. 4, 266–269 (1939),
Horning, Horning and Platt, J. Am. Chem. Soc. 71, 1771–1773 (1949),
Horning, Horning and Walker, ibid. 71, 169–171 (1949),
Hogg, ibid. 70, 161–164 (1948),
Dieckmann, Ber. 45, 2701 (1912), and
U.S. Patent 2,582,252.

Thus, by these general procedures, other esters of hindered 4-oxo-2-cyclohexene-1-carboxylic acids are obtained such as:

Ethyl 2 - methyl - 3 - (3,7 - dimethyloctyl) - 4 - oxo - 2 - cyclohexene-1-carboxylate,
Ethyl 2,3-dimethyl-4-oxo-2-cyclohexene-1-carboxylate,
Ethyl 2-methyl-3-ethyl-4-oxo-2-cyclohexene-1-carboxylate,
Ethyl 2-methyl-3-m-methoxyphenethyl-4-oxo-2-cyclohexene-1-carboxylate,
Ethyl 2,6-dimethyl-3-ethyl-4-oxo-2-cyclohexene-1-carboxylate,
Ethyl 2-methyl-3-ethyl-6-isopropyl-4-oxo-2-cyclohexene-1-carboxylate,
Ethyl 2-methyl-3-phenethyl-6-isopropyl-4-oxo-2-cyclohexene-1-carboxylate,
Methyl 2,3,6-trimethyl-4-oxo-2-cyclohexene-1-carboxylate,
Ethyl 2-ethyl-3-methyl-4-oxo-2-cyclohexene-1-carboxylate,
Ethyl 2-methyl-3-benzyl-4-oxo-2-cyclohexene-1-carboxylate, and the like.

The following examples illustrate the process and products of the present invention but these examples are illustrative only and are not to be construed as limiting.

*Example 1.—Ethyl 2,6-Dimethyl-4-Oximino-2-Cyclohexene-1-Carboxylate*

To a solution of 278 grams (4.0 moles) of hydroxylamine hydrochloride in 800 milliliters of pyridine and 500 milliliters of ethanol is added 500 grams (3.0 moles) of ethyl 2,6-dimethyl-4-oxo-2-cyclohexene-1-carboxylate. The solution is refluxed for four hours. The solvents are removed under reduced pressure and a reddish gum which is thus obtained is dissolved in benzene. The benzene solution is washed with several portions of water, dried over magnesium sulfate and concentrated. An oily material which is thus obtained is distilled under reduced pressure and the fraction of the desired ethyl 2,6-dimethyl-4-oximino-2-cyclohexene-1-carboxylate which distils between 155 and 162 degrees centigrade at 0.5 millimeter pressure is collected. A yield of 485 grams (76.5 percent) of ethyl 2,6-dimethyl-4-oximino-2-cyclohexene-1-carboxylate is obtained.

*Analysis.*—Calc. for $C_{11}H_{17}NO_3$: C, 62.52; H, 8.11; N, 6.63. Found: C, 62.11; H, 8.04; N, 6.49.

*Example 2.—Ethyl 2-Methyl-6-Ethyl-4-Oximino-2-Cyclohexane-1-Carboxylate*

A mixture of 26 grams (0.13 mole) of ethyl 2-methyl-6-ethyl - 4 - oxo-2-cyclohexene-1-carboxylate, 10.3 grams (0.15 mole) of hydroxylamine hydrochloride, and fifty milliliters of pyridine are heated on a steam bath for three hours. The pyridine is removed from the mixture by distillation under reduced pressure. The residue is dissolved in ether and the resulting solution is washed with several portions of water, dried over magnesium sulfate and concentrated. The oily material thus obtained is distilled under reduced pressure and the fraction of the desired ethyl 2-methyl-6-ethyl-4-oximino-2-cyclohexene-1-carboxylate which distils between 163 and 165 degrees centigrade at 0.9 millimeter pressure is collected.

*Analysis.*—Calc. for $C_{12}H_{19}NO_3$: N, 6.39. Found: N, 6.18.

*Example 3.—Ethyl 2-Methyl-6-Isopropyl-4-Oximino-2-Cyclohexene-1-Carboxylate*

In a three-later, one-neck flask fitted with a reflux condenser are placed 448.6 grams (2.0 moles) of ethyl 2-methyl - 6 - isopropyl - 4 - oxo - 2 - cyclohexene - 1 - carboxylate, 278 grams (4.0 moles) of hydroxylamine hydrochloride, 700 milliliters of anhydrous pyridine and 500 milliliters of absolute ethanol. The mixture is refluxed for four hours and then allowed to stand at 23 degrees centigrade for fifteen hours. The alcohol and pyridine are then removed from the mixture by distillation under reduced pressure and the cooled residue dissolved in two liters of ether. The resulting solution is extracted with six one-liter portions of water, dried over magnesium sulfate and then distilled. There is obtained 207 grams of ethyl 2-methyl-6-isopropyl-4-oximino-2-cyclohexene-1-carboxylate (43 percent yield) boiling between 138 and 142 degrees centigrade at 0.3 millimeter pressure and characterized by an index of refraction $n_D^{25} = 1.5070$.

*Analysis.*—Calc. for $C_{13}H_{21}NO_3$: N, 5.85. Found: N, 5.82.

Similarly, on replacing ethyl 2,6-dimethyl-4-oxo-2-cyclohexene-1-carboxylate in Example 1 by other hindered 4-oxo-2-cyclohexene-1-carboxylic acid esters, other hindered 4-oximino-2-cyclohexene-1-carboxylic acid esters are obtained. Thus, for example, using ethyl 2-methyl-4-oxo-2-cyclohexene-1-carboxylate as the starting material, ethyl 2-methyl-4-oximino-2-cyclohexene-1-carboxylate is obtained; ethyl 2-ethyl-3,6-dimethyl-4-oximino-2-cyclohexene-1-carboxylate is obtained from ethyl 2-ethyl-3,6 - dimethyl-4-oxo-2-cyclohexene-1-carboxylate; benzyl 2,6-diethyl-4-oximino-2-cyclohexene-1-carboxylate is obtained from benzyl 2,6-diethyl-4-oxo-2-cyclohexene-1-carboxylate; ethyl 2-methyl-6-(2-furyl)-4-oximino-2-cyclohexene-1-carboxylate is obtained from ethyl 2-methyl-6-(2-furyl)-4-oxo-2-cyclohexene-1-carboxylate; ethyl 2-methyl-6-cyclohexyl - 4 - oximino - 2 - cyclohexene-1-carboxylate is obtained from ethyl 2-methyl-6-cyclohexyl-4-oxo - 2 - cyclohexene-1-carboxylate; ethyl 2-methyl-6-p-methoxyphenethyl-4-oximino-2-cyclohexene-1-carboxylate is obtained from ethyl 2-methyl-6-p-methoxyphenethyl-4-oxo-2-cyclohexene-1-carboxylate; ethyl 2,6-diphenyl-4-oximino-2-cyclohexene-1-carboxylate is obtained from ethyl 2,6 - diphenyl - 4 - oxo-2-cyclohexene-1-carboxylate; and ethyl 2-methyl-3-p-methoxybenzyl-4-oximino-2-cyclohexene-1-carboxylate is obtained from ethyl 2-methyl-3-p-methoxybenzyl-4-oxo-2-cyclohexene-1-carboxylate.

Similarly, using the procedure set forth in Example 1 except for the replacement of ethyl 2,6-dimethyl-4-oxo-2-cyclohexene-1-carboxylate by other hindered 4-oxo-2-cyclohexene-1-carboxylic acid esters, other hindered 4-oximino-2-cyclohexene-1-carboxylic acid esters are prepared such as:

Phenethyl 2,6-dimethyl-4-oximino - 2 - cyclohexene-1-carboxylate,
Butyl 2 - methyl-6-benzyl-4-oximino-2-cyclohexene-1-carboxylate,
Ethyl 2-methyl-3-(3,7-dimethyloctyl)-4-oximino-2-cyclohexene-1-carboxylate,
Ethyl 2,6-diethyl-4-oximino-2-cyclohexene-1-carboxylate,
Ethyl 2-methyl-3-m-methoxyphenethyl-4-oximino-2-cyclohexene-1-carboxylate,
Ethyl 2-methyl-6-n-hexyl-4-oximino-2-cyclohexene-1-carboxylate,
Ethyl 2-n-butyl-4-oximino-2-cyclohexene-1-carboxylate,
Ethyl 2 - methyl-6-o-methylbenzyl-4-oximino-2-cyclohexene-1-carboxylate,
Ethyl 2-methyl-6-p-methoxyphenethyl-4-oximino-2-cyclohexene-1-carboxylate,
Ethyl 2,6-dimethyl-3-ethyl - 4 - oximino-2-cyclohexene-1-carboxylate,
Ethyl 2 - methyl-3-benzyl-6-isopropyl-4-oximino-2-cyclohexene-1-carboxylate,
Ethyl 2-ethyl-4-oximino-2-cyclohexene-1-carboxylate,
Ethyl 2 - methyl-6-p-tolyl-4-oximino-2-cyclohexene-1-carboxylate,
Ethyl 2,3 - dimethyl-4-oximino-2-cyclohexene-1-carboxylate, and the like.

*Example 4.—Ethyl 2,6-Dimethyl-4-Acetamidobenzoate*

161 grams (0.76 mole) of ethyl 2,6-dimethyl-4-oximino-2-cyclohexene-1-carboxylate (Example 1) is added to a cooled solution of 450 milliliters of acetic anhydride. Accompanied by stirring, the mixture is warmed to room temperature and then allowed to stand for a period of about eighteen hours. 200 milliliters of acetic acid is added to the mixture and a rapid stream of dry hydrogen chloride gas is passed therethrough while heating to gentle reflux temperature. After six hours, at reflux temperature, the mixture is cooled and poured, while stirring, onto ice. After allowing the cooled mixture to stand for about eighteen hours, a solid material which separates out is recovered by filtration and then dried over phosphorus pentoxide. A yield of 170 grams (95.5 percent) of ethyl 2,6-dimethyl-4-acetamidobenzoate is obtained which melts between 139 and 140 degrees centigrade after recrystallization from methylcyclohexane.

*Analysis.*—Calc. for $C_{13}H_{17}NO_3$: C, 66.35; H, 7.28; N, 5.94. Found: C, 66.52; H, 7.37; N, 6.00.

*Example 5.—Ethyl-2-Methyl-6-Ethyl-4-Acetamidobenzoate*

45 grams of ethyl 2-methyl-6-ethyl-4-oximino-2-cyclohexene-1-carboxylate (Example 2) is added to 150 milliliters of acetic anhydride. After allowing the mixture to stand for a period of about eighteen hours, 100 milliliters of acetic acid is added and a rapid stream of dry hydrogen chloride gas is passed through the mixture while heating to gentle reflux temperature. After about six hours at reflux temperature, the mixture is cooled and poured, while stirring, onto ice. A solid material separates out which is then recovered by filtration, washed with water and air dried. After recrystallizing from methylcyclohexane, forty grams of ethyl 2-methyl-6-ethyl-4-acetamidobenzoate is obtained melting between 110 and 111 degrees centigrade.

*Analysis.*—Calc. for $C_{14}H_{19}NO_2$: C, 67.44; H, 7.68; N, 5.62. Found: C, 67.28; H, 7.60; N, 5.74.

*Example 6.—Ethyl 2-Methyl-6-Isopropyl-4-Acetamidobenzoate*

151 grams (0.63 mole) of ethyl 2-methyl-6-isopropyl-4-oximino-2-cyclohexene-1-carboxylate (Example 3) is added to a cooled solution of 450 milliliters of acetic anhydride. After allowing the mixture to stand for eighteen hours, 200 milliliters of acetic acid is added and a stream of dry hydrogen chloride gas is passed therethrough while heating to gentle reflux temperature. After six hours at reflux temperature, the mixture is cooled and poured, while stirring, onto ice. The cooled mixture is allowed to stand for about eighteen hours, during which time a crystalline material separates out. The crystalline material is recovered by filtration, then washed with water, and recrystallized from isopropanol. A yield of 56 grams (34 percent) of ethyl 2-methyl-6-isopropyl-4- acetamidobenzoate is obtained melting between 98 and 99 degrees centigrade.

*Analysis.*—Calc. for $C_{15}H_{21}NO_3$: C, 68.61; H, 7.90; N, 5.99. Found: C, 68.41; H, 8.04; N, 5.95.

Similarly, on replacing ethyl 2,6-dimethyl-4-oximino-2-cyclohexene-1-carboxylate in Example 4 by other hindered 4-oximino-2-cyclohexene-1-carboxylic acid esters and by reacting these compounds with acylating agents such as anhydrides of lower-aliphatic acids such as, for example, acetic anhydride, propionic anhydride, butyric anhydride, isobutyric anhydride, and the like, in the presence of lower-aliphatic acid such as acetic acid, propionic acid, butyric acid, and the like, and a hydrogen halide, other hindered 4-acylamidobenzoic acid esters are obtained. Thus, for example, on reacting ethyl 2-methyl-4-oximino-2-cyclohexene-1-carboxylate with acetic anhydride, acetic acid, and dry hydrogen chloride, ethyl 2-methyl-4-acetamidobenzoate is obtained. In a like manner, ethyl 2-ethyl-3,6-dimethyl-4-propionamidobenzoate is obtained from ethyl 2-ethyl 3,6-dimethyl-4-oximino-2-cyclohexene-1-carboxylate, propionic anhydride, propionic acid, and dry hydrogen bromide; benzyl 2,6-diethyl-4-acetamidobenzoate is obtained from benzyl 2,6-diethyl-4-oximino-2-cyclohexene-1-carboxylate, acetic anhydride, valeric acid, and dry hydrogen chloride; ethyl 2-methyl-6-(2-furyl)-4-butyramidobenzoate is obtained from ethyl 2-methyl-6-(2-furyl)-4-oximino-2-cyclohexene-1-carboxylate, butyric anhydride, butyric acid, and dry hydrogen chloride; ethyl 2-methyl-6-p-methoxyphenethyl-4-acetamidobenzoate is obtained from ethyl 2-methyl-6-p-methoxyphenethyl-4-oximino-2-cyclohexene-1-carboxylate, acetic anhydride, acetic acid, and dry hydrogen chloride; ethyl 2,6-diphenyl-4-acetamidobenzoate is obtained from ethyl 2,6-diphenyl-4-oximino-2-cyclohexene-1-carboxylate, acetic anhydride, acetic acid, and dry hydrogen chloride; ethyl 2-methyl-6-cyclohexyl-4-acetamidobenzoate is obtained from ethyl 2-methyl-6-cyclohexyl-4-oximino-2-cyclohexene-1-carboxylate, acetic anhydride, acetic acid, and dry hydrogen chloride; and ethyl 2-methyl-3-p-methoxyphenethyl-4-acetamidobenzoate is obtained from ethyl 2-methyl-3-p-methoxyphenethyl-4-oximino-2-cyclohexene-1-carboxylate, acetic anhydride, acetic acid, and dry hydrogen bromide.

Similarly, other hindered 4-acylamidobenzoic acid esters are obtained such as:

Ethyl 2-methyl-6-n-hexyl-4-acetamidobenzoate,
Ethyl 2-methyl-6-isopropyl-4-propionamidobenzoate,
Ethyl 2-methyl-6-p-methoxyphenethyl-4-butyramidobenzoate,
Ethyl 2,6-diethyl-4-isobutyramidobenzoate,
Phenethyl 2,6-dimethyl-4-acetamidobenzoate,
Ethyl 2-methyl-6-o-methylbenzyl-4-acetamidobenzoate,
Butyl 2-methyl-6-benzyl-4-acetamidobenzoate,
Ethyl 2-ethyl-4-acetamidobenzoate,
Ethyl 2-n-butyl-4-acetamidobenzoate,
Ethyl 2-methyl-6-p-tolyl-4-acetamidobenzoate,
Ethyl 2-methyl-3-(3,7-dimethyloctyl)-4-acetamidobenzoate,
Ethyl 2,3-dimethyl-4-acetamidobenzoate,
Ethyl 2-methyl-3-m-methoxyphenethyl-4-acetamidobenzoate,
Ethyl 2,6-dimethyl-3-ethyl-4-acetamidobenzoate,
Ethyl 2-methyl-3-benzyl-6-isopropyl-4-acetamidobenzoate, and the like.

*Example 7.—2,6-Dimethyl-4-Acetamidobenzoic Acid*

Fifteen grams (0.064 mole) of ethyl 2,6-dimethyl-4-acetamidobenzoate (Example 4) is added to a solution of 35 grams (0.62 mole) of potassium hydroxide in 150 milliliters of ethylene glycol. The mixture is heated to a temperature between 160 and 170 degrees centigrade and maintained within that range for a period of five hours. The solution is allowed to cool, then poured into 200 milliliters of water and the resulting solution is cooled in an ice bath. While stirring, 25 milliliters of acetic anhydride is added to the solution over a 45-minute period. A second 25-milliliter portion of acetic anhydride is added to the mixture followed by the addition of about 25 milliliters of concentrated hydrochloric acid. The solution which is now strongly acidic, is repeatedly extracted with ether to give about two liters of extract and the extract is then dried with anhydrous magnesium sulfate. After drying for eighteen hours, the solution is filtered and concentrated to form a mixture of a solid material and an oil. The mixture of solid material and oil is dissolved in 25 milliliters of five percent sodium hydroxide solution, the resulting solution washed with ether and the basic layer is acidified. A yield of eight grams (60.5 percent) of 2,6-dimethyl-4-acetamidobenzoic acid is obtained in the form of a precipitate. The melting point of this compound, after recrystallization from ethyl acetate, is 214 to 216 degrees centigrade.

*Analysis.*—Calc. for $C_{11}H_{13}NO_3$: C, 63.76; H, 6.32; N, 6.76. Found: C, 63.46; H, 6.27; N, 6.75.

*Example 8.—2-Methyl-6-Ethyl-4-Acetamidobenzoic Acid*

Following the procedure described in Example 7 except for the replacement of ethyl 2,6-dimethyl-4-acetamidobenzoate by ethyl 2-methyl-6-ethyl-4-acetamidobenzoate (Example 5), 2-methyl-6-ethyl-4-acetamidobenzoic acid is obtained (96 percent yield) melting between 203 and 204 degrees centigrade (tube).

*Analysis.*—Calc. for $C_{12}H_{15}NO_3$: C, 65.14; H, 6.83; N, 6.33. Found: C, 65.15; H, 6.68; N, 6.42.

*Example 9.—2-Methyl-6-Isopropyl-4-acetamidobenzoic Acid*

Following the procedure described in Example 7 except for the replacement of ethyl 2,6-dimethyl-4-acetamidobenzoate by ethyl 2-methyl-6-isopropyl-4-acetamidobenzoate (Example 6), 2-methyl-6-isopropyl-4-acetamidobenzoic acid is obtained (sixty percent yield) melting between 194 and 197 degrees centigrade (tube).

*Analysis.*—Calcd. for $C_{13}H_{17}NO_3$: C, 66.58; H, 6.82; N, 5.99. Found: C, 66.36; H, 7.13; N, 5.95.

Using the procedure described in Example 7 except for the replacement of acetic anhydride by other acylating agents such as, acetyl chloride, acetyl bromide, propionyl chloride, propionic anhydride, butyric anhydride, butyryl chloride, isobutyric anhydride, caproic anhydride, caproyl chloride, heptanoic anhydride, and the like; tosyl chloride p-toluenesulfonyl chloride), tosyl bromide (p-toluene-sulfonyl bromide), benzenesulfonyl chloride, and the like; benzoyl bromide, benzoyl chloride, and the like, other 2,6-dimethyl-4-acylamidobenzoic acids are obtained. Thus, by using propionic anhydride in the above reaction, 2,6-dimethyl-4-propionamidobenzoic acid is obtained. In a like manner, 2,6-dimethyl-4-p-toluenesulfonamidobenzoic acid is obtained by the use of p-toluenesulfonyl chloride; 2,6-dimethyl-4-benzenesulfonamidobenzoic acid is obtained by the use of benzenesulfonyl chloride; and 2,6-dimethyl-4-benzamidobenzoic acid is obtained by the use of benzoyl chloride. Ordinarily, it is preferred to utilize an acylating agent containing not more than seven carbon atoms and more particularly, an acylating agent derived from a lower-aliphatic monocarboxylic acid containing not more than seven carbon atoms such as the anhydrides or acid halides of said lower-aliphatic monocarboxylic acids.

Similarly, on replacing ethyl 2,6-dimethyl-4-acetamidobenzoate in Example 7 by other hindered 4-acylamidobenzoic acid esters, and by the use of an acylating agent such as described supra, other hindered 4-acylamidobenzoic acids are obtained. Thus, for example, by the use of ethyl 2-methyl-4-acetamidobenzoate, 2-methyl-4-acetamidobenzoic acid is obtained; 2-ethyl-3,6-dimethyl-4-propionamidobenzoic acid is obtained by the use of ethyl 2-ethyl-3,6-dimethyl-4-propionamidobenzoate; 2,6-diethyl-4-acetamidobenzoic acid is obtained by the use of benzyl 2,6-diethyl-4-acetamidobenzoate; 2-methyl-6-(2-furyl)-4-butyramidobenzoic acid is obtained by the use of ethyl 2-methyl-6-(2-furyl)-4-butyramidobenzoate; 2-methyl-6-p-methoxyphenethyl-4-acetamidobenzoic acid is obtained by the use of ethyl 2-methyl-6-p-methoxyphenethyl-4-acetamidobenzoate; 2,6-diphenyl-4-acetamidobenzoic acid is obtained by the use of ethyl 2,6-diphenyl-4-acetamidobenzoate; 2-methyl-6-cyclohexyl-4-acetamidobenzoic acid is obtained by the use of ethyl 2-methyl-6-cyclohexyl-4-acetamidobenzoate; and 2-methyl-3-p-methoxyphenethyl-4-acetamidobenzoic acid is obtained by the use of ethyl 2-methyl-3-p-methoxyphenethyl-4-acetamidobenzoate.

In the same manner, i.e., by replacing ethyl 2,6-dimethyl-4-acetamidobenzoate in Example 7 by other hindered 4-acylamidobenzoic acid esters, and by the use of an acylating agent such as described supra, other hindered 4-acylamidobenzoic acids are obtained such as:

2-methyl-6-n-hexyl-4-acetamidobenzoic acid,
2-methyl-6-isopropyl-4-propionamidobenzoic acid,
2-methyl-6-p-methoxyphenethyl-4-butyramidobenzoic acid,
2,6-diethyl-4-isobutyramidobenzoic acid,
2-methyl-6-o-methylbenzyl-4-acetamidobenzoic acid,
2-methyl-6-benzyl-4-acetamidobenzoic acid,
2-ethyl-4-acetamidobenzoic acid,
2-n-butyl-4-acetamidobenzoic acid,
2-methyl-6-p-tolyl-4-acetamidobenzoic acid,
2-methyl-3-(3,7-dimethyloctyl)-4-acetamidobenzoic acid,
2,3-dimethyl-4-acetamidobenzoic acid,
2-methyl-3-m-methoxyphenethyl-4-acetamidobenzoic acid,
2,6-dimethyl-3-ethyl-4-acetamidobenzoic acid,
2-methyl-3-benzyl-6-isopropyl-4-acetamidobenzoic acid,
and the like.

The deacylation step in Example 7 can be effected without producing any change in other positions on the ring by three alternative procedures such as (1), reacting the hindered 4-acylamidobenzoic acid ester with a dilute alkali for a short period of time, e.g., about four hours, or (2), alcoholysis or (3), ammonolysis, the alcoholysis and ammonolysis procedures being conducted at a temperature higher than 100 degrees centigrade for periods of time varying between ten and 48 hours. By such procedures, hindered 4-aminobenzoic acid esters are obtained such as:

Ethyl 2,6-dimethyl-4-aminobenzoate,
Methyl 2,6-dimethyl-4-aminobenzoate,
Benzyl 2,6-diethyl-4-aminobenzoate,
Ethyl 2-methyl-6-cyclohexyl-4-aminobenzoate,
Ethyl 2,6-diphenyl-4-aminobenzoate,
Ethyl 2-methyl-6-p-methoxyphenethyl-4-aminobenzoate,
Ethyl 2-methyl-6-n-hexyl-4-aminobenzoate,
Ethyl 2-methyl-4-aminobenzoate,
Ethyl 2-methyl-6-(2-furyl)-4-aminobenzoate,
Ethyl 2-ethyl-3,6-dimethyl-4-aminobenzoate,
Ethyl 2-methyl-6-o-methylbenzyl-4-aminobenzoate,
Butyl 2-methyl-6-benzyl-4-aminobenzoate,
Ethyl 2-methyl-6-p-methoxyphenethyl-4-aminobenzoate,
Ethyl 2-methyl-3-p-methoxyphenethyl-4-aminobenzoate,
Ethyl 2-methyl-6-isopropyl-4-aminobenzoate,
Ethyl 2,6-diethyl-4-aminobenzoate,
Phenethyl 2,6-dimethyl-4-aminobenzoate,
Ethyl 2-n-butyl-4-aminobenzoate,
Ethyl 2-methyl-3-(3,7-dimethyloctyl)-4-aminobenzoate,
Ethyl 2-methyl-3-m-methoxyphenethyl-4-aminobenzoate,
Ethyl 2,6-dimethyl-3-ethyl-4-aminobenzoate,
Ethyl 2-methyl-3-benzyl-6-isopropyl-4-aminobenzoate,
Ethyl 2-ethyl-4-aminobenzoate,
Ethyl 2-methyl-6-p-tolyl-4-aminobenzoate,
Ethyl 2,3-dimethyl-4-aminobenzoate, and the like.

The hindered 4-aminobenzoic acid esters thus obtained are hydrolyzed to obtain the corresponding hindered 4-aminobenzoic acid such as:

2,6-dimethyl-4-aminobenzoic acid,
2,6-diethyl-4-aminobenzoic acid,
2-methyl-6-cyclohexyl-4-aminobenzoic acid,
2,6-diphenyl-4-aminobenzoic acid,
2-ethyl-3,6-dimethyl-4-aminobenzoic acid,
2-methyl-6-n-hexyl-4-aminobenzoic acid,
2-methyl-4-aminobenzoic acid,
2-methyl-6-(2-furyl)-4-aminobenzoic acid,
2-methyl-3-p-methoxyphenethyl-4-aminobenzoic acid,
2-methyl-6-o-methylbenzyl-4-aminobenzoic acid,
2-methyl-6-benzyl-4-aminobenzoic acid,
2-methyl-6-p-methoxyphenethyl-4-aminozoic acid,
2-methyl-6-isopropyl-4-aminobenzoic acid,
2-n-butyl-4-aminobenzoic acid,
2-methyl-3-benzyl-6-isopropyl-4-aminobenzoic acid,
2-ethyl-4-aminobenzoic acid,
2-methyl-6-p-tolyl-4-aminobenzoic acid,
2,3-dimethyl-4-aminobenzoic acid,
2-methyl-3-(3,7-dimethyloctyl)-4-aminobenzoic acid,
2 methyl-3-m-methoxyphenethyl-4-aminobenzoic acid,
2,6-dimethyl-3-ethyl-4-aminobenzoic acid, and the like.

The hindered 4-aminobenzoic acids thus obtained are then acylated with conventional acylating agents such as anhydrides of lower-aliphatic acids such as acetic anhydride, propionic anhydride, butyric anhydride, and the like, arylsulfonyl halides such as p-toluenesulfonyl chloride, p-toluenesulfonyl bromide, benzenesulfonyl chloride, benzenesulfonyl bromide, and the like, aroyl halides such as benzoyl chloride, benzoyl bromide, and the like, to obtain the corresponding hindered 4-acylamidobenzoic acids.

*Example 10.—2,6-Dimethyl-4-Acetamidobenzoyl Chloride*

In a dry, 2-liter, three-neck flask fitted with stirrer and reflux condenser are placed 207 grams (1.01 mole) of 2,6-dimethyl-4-acetamidobenzoic acid (Example 7), one liter of dry benzene and 179 grams (1.5 mole—110 milliliters) of thionyl chloride. The mixture is stirred and slowly heated to reflux. When reflux temperature is reached, the reaction becomes somewhat violent and must be controlled by cooling the container in an ice-bath. After the reaction has subsided, stirring and refluxing are continued for an additional 45 minutes. The mixture is cooled in an ice-bath for one hour and filtered. The solid material is washed with cold, dry benzene and dried in a vacuum desiccator. A yield of 192 grams (85 percent) of 2,6-dimethyl-4-acetamidobenzoyl chloride is obtained melting between 110 and 118 degrees centigrade.

*Example 11.—2-Methyl-6-Ethyl-4-Acetamidobenzoyl Chloride*

Following the procedure described in Example 10 except for the replacement of 2,6-dimethyl-4-acetamidobenzoic acid by 2-methyl-6-ethyl-4-acetamidobenzoic acid (Example 8), 2-methyl-6-ethyl-4-acetamidobenzoyl chloride is obtained.

*Example 12.—2-Methyl-6-Isopropyl-4-Acetamidobenzoyl Chloride*

Following the procedure described in Example 10 except for the replacement of 2,6-dimethyl-4-acetamidobenzoic acid by 2-methyl-6-isopropyl-4-acetamidobenzoic acid (Example 9), 2-methyl-6-isopropyl-4-acetamidobenzoyl chloride is obtained.

Similarly, using the procedure of Example 10 except for the replacement of 2,6-dimethyl-4-acetamidobenzoic acid by other hindered 4-acylamindobenzoic acids, other hindered 4-acylamidobenzoyl chlorides are obtained. Thus, for example, on reacting 2,6-dimethyl-4-propionamidobenzoic acid with an inorganic acid chloride, 2,6-dimethyl-4-propionamidobenzoyl chloride is obtained. In a like manner, 2,6-dimethyl-4-p-toluenesulfonamidobenzoyl chloride is obtained by reacting 2,6-dimethyl-4-p-toluenesulfonamidobenzoic acid with an inorganic acid chloride; 2,6-dimethyl-4-benzenesulfonamidobenzoyl chloride is obtained by reacting 2,6-dimethyl-4-benzenesulfonamidobenzoic acid with an inorganic acid chloride; 2,6-dimethyl-4-benzamidobenzoyl chloride is obtained by reacting 2,6-dimethyl-4-benzamidobenzoic acid with an inorganic acid chloride; 2-methyl-4-acetamidobenzoyl chloride is obtained by reacting 2-methyl-4-acetamidobenzoic acid with an inorganic acid chloride; 2-ethyl-3,6-dimethyl-4-propionamidobenzoyl chloride is obtained by reacting 2-ethyl-3,6-dimethyl-4-propionamidobenzoic acid with an inorganic acid chloride; 2,6-diethyl-4-acetamidobenzoyl chloride is obtained by reacting 2,6-diethyl-4-acetamidobenzoic acid with an inorganic acid chloride; 2-methyl-6-(2-furyl)-4-butyramidobenzoyl chloride is obtained by reacting 2-methyl-6-(2-furyl)-4-butyramidobenzoic acid with an inorganic acid chloride; 2-methyl-6-p-methoxyphenethyl-4-acetamidobenzoyl chloride is obtained by reacting 2-methyl-6-p-methoxyphenethyl-4-acetamidobenzoic acid with an inorganic acid chloride; 2,6-diphenyl-4-acetamidobenzoyl chloride is obtained by reacting 2,6-diphenyl-4-acetamidobenzoic acid with an inorganic acid chloride; 2-methyl-6-cyclohexyl-4-acetamidobenzoyl chloride is obtained by reacting 2-methyl-6-cyclohexyl-4-acetamidobenzoic acid with an inorganic acid chloride; and 2-methyl-3-p-methoxyphenethyl-4-acetamidobenzoyl chloride is obtained by reacting 2-methyl-3-p-methoxyphenethyl-4-acetamidobenzoic acid with an inorganic acid chloride.

In the same manner, on replacing 2,6-dimethyl-4-acetamidobenzoic acid in Example 10 by other hindered 4-acylamidobenzoic acids there are obtained:

2-methyl-6-n-hexyl-4-acetamidobenzoyl chloride,
2-methyl-6-isopropyl-4-propionamidobenzoyl chloride,
2-methyl-6-p-methoxyphenethyl-4-butyramidobenzoyl chloride,
2,6-diethyl-4-isobutyramidobenzoyl chloride,
2-methyl-6-o-methylbenzyl-4-acetamidobenzoyl chloride,
2-methyl-6-benzyl-4-acetamidobenzoyl chloride,
2-ethyl-4-acetamidobenzoyl chloride,
2-n-butyl-4-acetamidobenzoyl chloride,
2-methyl-6-p-tolyl-4-acetamidobenzoyl chloride,
2-methyl-3-(3,7-dimethyloctyl)-4-acetamidobenzoyl chloride,
2,3-dimethyl-4-acetamidobenzoyl chloride,
2-methyl-3-m-methoxyphenethyl-4-acetamidobenzoyl chloride,
2,6-dimethyl-3-ethyl-4-acetamidobenzoyl chloride,
2-methyl-3-benzyl-6-isopropyl-4-acetamidobenzoyl chloride, and the like.

It should be noted that by replacing thionyl chloride in the above indicated procedure by phosphorus trichloride, phosphorus pentachloride, or the like, hindered 4-acylamidobenzoyl chlorides are also obtained.

Similarly, by using thionyl bromide, phosphorus tribromide, phosphorus pentabromide, or the like, the corresponding hindered 4-acylamidobenzoyl bromides are obtained.

*Example 13.—N-β-Diethylaminoethyl-2,6-Dimethyl-4-Acetamidobenzamide*

In a dry 500-milliliter, three-neck flask fitted with a stirrer, reflux condenser and dropping funnel are placed forty grams (0.178 mole) of 2,6-dimethyl-4-acetamidobenzoyl chloride (Example 10) and 200 milliliters of dry benzene. The mixture is stirred and cooled in an ice-bath while adding dropwise, over a one hour period, 46.5 grams (0.4 mole) of β-diethylaminoethylamine dissolved in 100 milliliters of dry benzene. The mixture is stirred, while maintained at a temperature of 25 degrees centigrade, for twenty hours. The benzene is removed by distillation and a viscous, oily product is obtained. This material is distilled in vacuo and the main fraction boiling between 190 and 210 degrees centigrade at 0.01 millimeter pressure, which is identified by infrared analysis as N-β-diethylaminoethyl-2,6-dimethyl-4-acetamidobenzamide, is recovered.

*Example 14.—N-β-Diethylaminoethyl-2-Methyl-6-Ethyl-4-Acetamidobenzamide*

Following the procedure described in Example 13 except for the substitution of 2,6-dimethyl-4-acetamidobenzoyl chloride by 2-methyl-6-ethyl-4-acetamidobenzoyl chloride (Example 11), N-β-diethylaminoethyl-2-methyl-6-ethyl-4-acetamidobenzamide is obtained.

*Example 15.—N-β-Diethylaminoethyl-2-Methyl-6-Isopropyl-4-Acetamidobenzamide*

Following the procedure described in Example 13 except for the substitution of 2,6-dimethyl-4-acetamidobenzoyl chloride by 2-methyl-6-isopropyl-4-acetamidobenzoyl chloride (Example 12), N-β-diethylaminoethyl-2-methyl-6-isopropyl-4-acetamidobenzamide is obtained.

Following the procedure described in Example 13 except for the replacement of β-diethylaminoethylamine by other secondary amino alkylamines, other hindered 4-acylamidobenzamides are obtained. Thus, for example, on reacting 2,6-dimethyl-4-acetamidobenzoyl chloride with diethylaminomethylamine, N-diethylaminomethyl-2,6-dimethyl-4-acetamidobenzamide is obtained. In a like manner, N-zeta-diethylaminohexyl-2,6-dimethyl-4-acetamidobenzamide is obtained by reacting 2,6-dimethyl-4-acetamidobenzoyl chloride with zeta-diethylaminohexylamine; N-β-methylcyclohexylaminoethyl-2,6-dimethyl-4-acetamidobenzamide is obtained by reacting 2,6-dimethyl-4-acetamidobenzoyl chloride with β-methylcyclohexylaminoethylamine; N-methyl-N-β-diethylaminoethyl-2,6-dimethyl-4-acetamidobenzamide is obtained by reacting 2,6-dimethyl-4-acetamidobenzoyl chloride with N-methyl-N-β-diethylaminoethylamine; N-(β-methylcyclohexylaminoethyl)-N-ethyl-2,6-dimethyl-4-acetamidobenzamide is obtained by reacting 2,6-dimethyl-4-acetamidobenzoyl chloride with N-ethyl-N-(β-methylcyclohexylaminoethyl)-amine; N-β-(1-pyrrolidyl)-ethyl-2,6-dimethyl-4-acetamidobenzamide is obtained by reacting 2,6-dimethyl-4-acetamidobenzoyl chloride with β-(1-pyrrolidyl)-ethylamine; N-β-(2,2-dimethyl-1-pyrrolidyl)ethyl-2,6-dimethyl-4-acetamidobenzamide is obtained by reacting 2,6-dimethyl-4-acetamidobenzoyl chloride with β-(2,2-dimethyl-1-pyrrolidyl)-ethylamine; N-β-(1-piperidyl)ethyl-2,6-dimethyl-4-acetamidobenzamide is obtained by reacting 2,6-dimethyl-4-acetamidobenzoyl chloride with β-(1-piperidyl)ethylamine; N-β-(2-methyl-1-piperidyl)ethyl-2,6-dimethyl-4-acetamidobenzamide is obtained by reacting 2,6-dimethyl-4-acetamidobenzoyl chloride with β-(2-methyl-1-piperidyl)ethylamine; N-butyl-N-γ-(1-piperidyl)-propyl-2,6-dimethyl-4-acetamidobenzamide is obtained by reacting 2,6-dimethyl-4-acetamidobenzoyl chloride with N-butyl-N-γ-(1-piperidyl)propylamine; N-β-(4-morpholinyl)ethyl-2,6-dimethyl-4-acetamidobenzamide is obtained by reacting 2,6-dimethyl-4-acetamidobenzoyl chloride with β-(4-morpholinyl)-ethylamine; N-β-(2-methyl-4-morpholinyl)ethyl-2,6-dimethyl-4-acetamidobenzamide is obtained by reacting 2,6-dimethyl-4-acetamidobenzoyl chloride with β-(2-methyl-4-morpholinyl)ethylamine; N-β-methylethylaminoethyl-2,6-dimethyl-4-acetamidobenzamide is obtained by reacting 2,6-dimethyl-4-acetamidobenzoyl chloride with β-methylethylaminoethylamine; and N-β-diisopropylaminopropyl-2,6-dimethyl-4-acetamidobenzamide is obtained by reacting 2,6-dimethyl-4-acetamidobenzoyl chloride with β-diisopropylaminopropylamine.

Similarly, on reacting β-diethylaminoethylamine with other 2,6-dimethyl-4-acylamidobenzoyl halides in the manner set forth in Example 13, other N-substituted 2,6-dimethyl-4-acylamidobenzamides are obtained. Thus, for example, on reacting 2,6-dimethyl-4-propionamidobenzoyl bromide with β-diethylaminoethylamine, N-β-diethylaminoethyl-2,6-dimethyl-4-propionamidobenzamide is obtained. In a like manner, N-β-diethylaminoethyl-2,6-dimethyl-4-p-toluenesulfonamidobenzamide is obtained from 2,6-dimethyl-4-p-toluenesulfonamidobenzoyl chloride; N-β-diethylaminoethyl-,6-dimethyl-4-benzenesulfonamidobenzamide is obtained from 2,6-dimethyl-4-benzenesulfonamidobenzoyl chloride; and N-β-diethylaminoethyl-2,6-dimethyl-4-benzamidobenzamide is obtained from 2,6-dimethyl-4-benzamidobenzoyl chloride.

Following the procedure described in Example 13 except for the substitution of 2,6-dimethyl-4-acetamidobenzoyl chloride by other hindered 4-acylamidobenzoyl halides, other hindered 4-acylamidobenzamides are obtained. Thus, for example, on reacting β-diethylaminoethylamine with 2-methyl-4-acetamidobenzoyl chloride, N - β - diethylaminoethyl - 2 - methyl - 4 - acetamidobenzamide is obtained. In a like manner, N-β-diethylaminoethyl - 2 - ethyl - 3,6 - dimethyl - 4 - propionamidobenzamide is obtained by reacting β-diethylaminoethylamine with 2-ethyl-3,6-dimethyl-4-propionamidobenzoyl bromide; N - β - diethylaminoethyl - 2,6 - diethyl - 4-acetamidobenzamide is obtained by reacting β-diethylaminoethylamine with 2,6-diethyl-4-acetamidobenzoyl chloride; N - β - diethylaminoethyl - 2 - methyl - 6 - (2-furyl)-4-butyramidobenzamide is obtained by reacting β-diethylaminoethylamine with 2-methyl-6-(2-furyl) - 4-butyramidobenzoyl chloride; N-β-diethylaminoethyl-2-methyl - 6 - p - methoxyphenethyl - 4 - acetamidobenzamide is obtained by reacting β-diethylaminoethylamine with 2-methyl-6-methoxyphenethyl - 4 - acetamidobenzoyl chloride; N - β - diethylaminoethyl - 2,6 - diphenyl - 4-acetamidobenzamide is obtained by reacting β-diethylaminoethylamine with 2,6-diphenyl-4-acetamidobenzoyl chloride; N - β - diethylaminoethyl - 2 - methyl - 6 - cyclohexyl-4-acetamidobenzamide is obtained by reacting β-diethylaminoethylamine with 2-methyl-6-cyclohexyl - 4-acetamidobenzoyl chloride; and N-β-diethylaminoethyl-2-methyl-3-p-methoxyphenethyl-4-acetamidobenzamide is obtained by reacting β-diethylaminoethylamine with 2-methyl-3-p-methoxyphenethyl-4-acetamidobenzoyl chloride.

Similarly, on replacing 2,6-dimethyl-4-acetamidobenzoyl chloride in Example 13 by other hindered 4-acylamidobenzoyl halides, other hindered 4-acylamidobenzamides are obtained such as:

N-β-diethylaminoethyl-2-methyl-6-n-hexyl-4-acetamidobenzamide,
N-β-diethylaminoethyl-2-methyl-6-isopropyl-4-propionamidobenzamide,
N-β-diethylaminoethyl-2-methyl-6-p-methoxyphenethyl-4-butyramidobenzamide,
N-β-diethylaminoethyl-2,6-diethyl-4-isobutyramidobenzamide,
N-β-diethylaminoethyl-2-methyl-6-o-methylbenzyl-4-acetamidobenzamide,
N-β-diethylaminoethyl-2-methyl-6-benzyl-4-acetamidobenzamide,
N-β-diethylaminoethyl-2-ethyl-4-acetamidobenzamide,
N-β-diethylaminoethyl-2-n-butyl-4-acetamidobenzamide,
N-β-diethylaminoethyl-2-methyl-6-p-tolyl-4-acetamidobenzamide,
N-β-diethylaminoethyl-2-methyl-3-(3,7-dimethyloctyl)-4-acetamidobenzamide,
N-β-diethylaminoethyl-2,3-dimethyl-4-acetamidobenzamide,
N-β-diethylaminoethyl-2-methyl-3-m-methoxyphenethyl-4-acetamidobenzamide,
N-β-diethylaminoethyl-2,6-dimethyl-3-ethyl-4-acetamidobenzamide,
N-β-diethylaminoethyl-2-methyl-3-benzyl-6-isopropyl-4-acetamidobenzamide, and the like.

*Example 16.—β-Diethylaminoethyl 2,6-Dimethyl-4-Acetamidobenzoate*

In a dry 100-milliliter, one-neck flask fitted with a reflux condenser, dropping funnel and drying tube is placed twenty grams (0.0885 mole) of 2,6-dimethyl-4-acetamidobenzoyl chloride (Example 10). Over a thirty minute period, 44 grams of β-diethylaminoethanol is added thereto. The mixture is heated on a steam bath for twenty hours at a temperature of 100 degrees centigrade, cooled to twenty degrees centigrade and 200 milliliters of water is added thereto. The solution is made basic with sodium hydroxide pellets, then extracted with ether and the ether layer then dried. The ether is removed by distillation and the brown, viscous oily residue solidifies upon cooling. There is obtained 18.8 grams (85 percent yield) of β-diethylaminoethyl 2,6-dimethyl-4-acetamidobenzoate melting between 89 and 91 degrees centigrade (tube) after recrystallization from methylcyclohexane.

*Analysis.*—Calc. for $C_{17}H_{26}N_2O_3$: C, 66.63; H, 8.55; N, 9.14. Found: C, 66.67; H, 8.65; N, 8.93.

*Example 17.—β-4-Morpholinylethyl 2,6-Dimethyl-4-Acetamidobenzoate*

Following the procedure described in Example 16 except for the replacement of β-diethylaminoethanol by β-4-morpholinylethanol, there is obtained β-4-morpholinylethyl 2,6-dimethyl-4-acetamidobenzoate melting between 115 and 116 degrees centigrade (tube) after recrystallization from methylcyclohexane.

*Analysis.*—Calc. for $C_{17}H_{24}N_2O_4$: C, 63.72; H, 7.55; N, 8.74. Found: C, 63.76; H, 7.74; N, 8.88.

*Example 18.—β-1-Piperidylethyl 2,6-Dimethyl-4-Acetamidobenzoate*

Following the procedure described in Example 16 except for the substitution of β-diethylaminoethanol by β-1-piperidylethanol, there is obtained β-1-piperidylethyl 2,6-dimethyl-4-acetamidobenzoate melting between 134 and 135 degrees centigrade (tube) after recrystallization from methylcyclohexane.

*Example 19.—β-Diethylaminoethyl 2-Methyl-6-Ethyl-4-Acetamidobenzoate*

Following the procedure described in Example 16 except for the replacement of 2,6-dimethyl-4-acetamidobenzoyl chloride by 2-methyl-6-ethyl-4-acetamidobenzoyl chloride (Example 11), β-diethylaminoethyl 2-methyl-6-ethyl-4-acetamidobenzoate is obtained.

*Example 20.—β-Diethylaminoethyl 2-Methyl-6-Isopropyl-4-Acetamidobenzoate*

Following the procedure described in Example 16 except for the replacement of 2,6-dimethyl-4-acetamidobenzoyl chloride by 2-methyl-6-isopropyl-4-acetamidobenzoyl chloride (Example 12), β-diethylaminoethyl 2-methyl-6-isopropyl-4-acetamidobenzoate is obtained.

Following the procedure described in Example 16 except for the replacement of β-diethylaminoethanol by other secondary-amino alkanols of the formula:

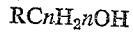

$$RC_nH_{2n}OH$$

wherein R is a secondary-amino radical, and $n$ is an integer from one to six inclusive, the corresponding 2,6-dimethyl-4-acylamidobenzoic acid esters are obtained, Suitable secondary-amino alkanols include dialkylaminoalkanols such as, for example, β-dimethylaminoethanol, dimethylaminomethanol, diethylaminomethanol, β-diethylaminopropanol, γ-diethylaminopropanol, β-diethylaminobutanol, δ-diethylaminobutanol, ε-diethylaminopentanol, zeta-diethylaminohexanol, β-dipropylaminoethanol, β-diisopropylaminoethanol, β-dipropylaminopropanol, γ-dipropylaminopropanol, β-dibutylaminoethanol, β-dibutylaminopropanol, β-methylethylaminoethanol, β-methylpropylaminoethanol, β-methylhexylaminoethanol, and the like; dicycloalklaminoalkanols such as, for example, β-dicyclopentylaminoethanol, β - dicyclohexylaminoethanol, and the like; alkyl aralkylaminoalkanols such as, for example, methylbenzylaminomethanol, β-ethylbenzylaminoethanol, β-propylbenzylaminoethanol, and the like; alkylcycloalkylaminoalkanols such as, for example, β-methylcyclohexylaminoethanol, and the like; diaralkylaminoalkanols such as, for example, β-dibenzylaminoethanol, β-diphenethylaminoethanol, and the like; heterocyclic aminoalkanols such as, for example, 1-pyrrolidylmethanol, β-1-pyrrolidylethanol, δ-1-pyrrolidylbutanol, and the like; carbon-substituted pyrrolidylalkanols, piperidylalkanols, morpholinylalkanols, such as, for example, β-(2-methyl-1-pyrrolidyl)ethanol, β-(2,2-dimethyl-1-pyrrolidyl)ethanol, β-(2-ethyl-1-pyrrolidyl)ethanol, β-(2-, 3-, and 4-methyl-1-piperidyl)ethanols, β-(2-, 3-, and 4-ethyl-1-piperidyl)-ethanols, β-(2-, and 3-methyl-4-morpholinyl)ethanols, β-(2-, and 3-ethyl-4-morpholinyl)ethanols, and the like.

Following the procedure described in Example 16 except for the replacement of β-diethylaminoethanol by other secondary-amino alkanols, the following 2,6-dimethyl-4-acetamidobenzoic acid esters are obtained:

Zeta-diethylaminohexyl 2,6-dimethyl-4-acetamidobenzoate,
β-Methylethylaminoethyl 2,6-dimethyl-4-acetamidobenzoate,
β-Dicyclohexylaminoethyl 2,6-dimethyl-4-acetamidobenzoate,
β-Ethylbenzylaminoethyl 2,6-dimethyl-4-acetamidobenzoate,
β-Dibenzylaminoethyl 2,6-dimethyl-4-acetamidobenzoate,
β-1-pyrrolidylethyl 2,6-dimethyl-4-acetamidobenzoate,
β-(2-methyl-1-pyrrolidyl)ethyl 2,6-dimethyl-4-acetamidobenzoate,
β-(2-methyl-1-piperidyl)ethyl 2,6-dimethyl-4-acetamidobenzoate,
β-(2-methyl-4-morpholinyl)ethyl 2,6-dimethyl-4-acetamidobenzoate.

Similarly, on reacting β-diethylamioethanol with other 2,6-dimethyl-4-acylamidobenzoyl halides in the manner set forth in Example 16, the following 2,6-dimethyl-4-acylamidobenzoic acid esters are obtained:

β-Diethylaminoethyl 2,6-dimethyl-4-propionamidobenzoate,
β-Diethylaminoethyl 2,6-dimethyl-4-butyramidobenzoate,
β-Diethylaminoethyl 2,6-dimethyl-4-p-toluenesulfonamidobenzoate,
β-Diethylaminoethyl 2,6-dimethyl-4-benzenesulfonamidobenzoate,
β-Diethylaminoethyl 2,6-dimethyl-4-benzamidobenzoate, and the like.

Following the procedure described in Example 16 except for the substitution of 2,6-dimethyl-4-acetamidobenzoyl chloride by other hindered 4-acylamidobenzoyl halides, other hindered 4-acylamidobenzoic acid esters are obtained such as:

β-Diethylaminoethyl 2-methyl-4-acetamidobenzoate,
β-Diethylaminoethyl 2-ethyl-3,6-dimethyl-4-propionamidobenzoate,
β-Diethylaminoethyl 2,6-diethyl-4-acetamidobenzoate,
β-Diethylaminoethyl 2-methyl-6-(2-furyl)-4-butyramidobenzoate,
β-Diethylaminoethyl 2-methyl-6-p-methoxyphenethyl-4-acetamidobenzoate,
β-Diethylaminoethyl 2,6-diphenyl-4-acetamidobenzoate,
β-Diethylaminoethyl 2-methyl-6-cyclohexyl-4-acetamidobenzoate,
β-Diethylaminoethyl 2-methyl-3-p-methoxyphenethyl-4-acetamidobenzoate,
β-Diethylaminoethyl 2-methyl-6-n-hexyl-4-acetamidobenzoate,
β-Diethylaminoethyl 2-methyl-6-isopropyl-4-proprionamidobenzoate,
β-Diethylaminoethyl 2-methyl-6-p-methoxyphenethyl-4-butyramidobenzoate,
β-Diethylaminoethyl 2,6-diethyl-4-isobutyramidobenzoate,
β-Diethylaminoethyl 2-methyl-6-o-methylbenzyl-4-acetamidobenzoate,
β-Diethylaminoethyl 2-methyl-6-benzyl-4-acetamidobenzoate,
β-Diethylaminoethyl 2-ethyl-4-acetamidobenzoate,
β-Diethylaminoethyl 2-n-butyl-4-acetamidobenzoate,
β-Diethylaminoethyl 2-methyl-6-p-tolyl-4-acetamidobenzoate,
β-Diethylaminoethyl 2-methyl-3-(3,7-dimethyloctyl)-4-acetamidobenzoate,
β-Diethylaminoethyl 2,3-dimethyl-4-acetamidobenzoate,
β-Diethylaminoethyl 2-methyl-3-m-methoxyphenethyl-4-acetamidobenzoate,
β-Diethylaminoethyl 2,6-dimethyl-3-ethyl-4-acetamidobenzoate,
β-Diethylaminoethyl 2-methyl-3-benzyl-6-isopropyl-4-acetamidobenzoate, and the like.

Following the procedure described in Example 13 except for the replacement of β-diethylaminoethylamine by compounds of the general formula:

$$RCnH_{2n}SH$$

wherein R is a secondary amino radical, and n is an integer from one to six inclusive, the corresponding 2,6-dimethyl-4-acylamidothiolobenzoic acid esters are obtained. Suitable secondary-amino lower alkyl mercaptans include, for example, β-dimethylaminoethyl mercaptan, β-diethylaminoethyl mercaptan, β-diethylaminopropyl mercaptan, γ-diethylaminopropyl mercaptan, zeta-diethylaminohexyl mercaptan, β-dipropylaminoethyl mercaptan, β-methylethylaminoethyl mercaptan, β-methylpropylaminoethyl mercaptan, and the like; dicycloalkylaminoalkyl mercaptans such as, for example, β-dicyclopentylaminoethyl mercaptan, β-dicyclohexylaminoethyl mercaptan, and the like; alkyl-aralkylamino mercaptans such as, for example, methylbenzylaminoethyl mercaptan, β-ethylbenzylaminoethyl mercaptan, and the like; diaralkylaminoalkyl mercaptans such as, for example, β-dibenzylaminoethyl mercaptan, β-diphenethylaminoethyl mercaptan, and the like; heterocyclic aminoalkyl mercaptans such as, for example, 1-pyrrolidylmethyl mercaptan, β-1-pyrrolidylethyl mercaptan, δ-1-pyrrolidylbutyl mercaptan, β-1-piperidylethyl mercaptan, β-4-morpholinylethyl mercaptan, and the like; carbon-substituted pyrrolidylalkyl-, piperidylalkyl-, and morpholinylalkyl mercaptans such as, for example, β-(2-methyl-1-pyrrolidyl)ethyl mercaptan, β-(2,2-dimethyl-1-pyrrolidyl)ethyl mercaptan, β-(2-ethyl-1-pyrrolidyl)ethyl mercaptan, β-(2-, 3-, and 4-methyl-1-piperidyl)ethyl mercaptans, β-(2-, 3-, and 4-ethyl-1-piperidyl)ethyl mercaptans, β-(2- and 3-methyl-4-morpholinyl)ethyl mercaptans, β-(2- and 3-ethyl-4-morpholinyl)ethyl mercaptans, and the like.

Following the procedure described in Example 13 except for the replacement of β-diethylaminoethylamine by secondary-amino alkyl mercaptans, the following 2,6-dimethyl-4-acetamidothiolobenzoic acid esters are obtained:

β-Diethylaminoethyl 2,6-dimethyl-4-acetamidothiolobenzoate,
Zeta-diethylaminohexyl 2,6-dimethyl-4-acetamidothiolobenzoate,
β-Methylethylaminoethyl 2,6-dimethyl-4-acetamidothiolobenzoate,
β-Dicyclohexylaminoethyl 2,6-dimethyl-4-acetamidothiolobenzoate,
β-Ethylbenzylaminoethyl 2,6-dimethyl-4-acetamidothiolobenzoate,
β-Dibenzylaminoethyl 2,6-dimethyl-4-acetamidothiolobenzoate,
β-1-pyrrolidylethyl 2,6-dimethyl-4-acetamidothiolobenzoate,
β-1-piperidylethyl 2,6-dimethyl-4-acetamidothiolobenzoate
β-4-morpholinylethyl 2,6-dimethyl-4-acetamidothiolobenzoate, β-(2-methyl-1-pyrrolidyl)ethyl 2,6-dimethyl-4-acetamido-thiolobenzoate, β-(2-methyl-1-piperidyl)ethyl 2,6-dimethyl-4-acetamido-thiolobenzoate, β-(2-methyl-4-morpholinyl)ether 2,6-dimethyl-4-acet-amidothiolobenzoate, and the like.

Similarly, on reacting β-diethylaminoethyl mercaptan with other 2,6-dimethyl-4-acylamidobenzoyl halides in the manner set forth in Example 13, other 2,6-dimethyl-4-acylamidothiolobenzoic acid esters are obtained such as:

β-Diethylaminoethyl 2,6-dimethyl-4-propionamidothiolo-benzoate,

β-Diethylaminoethyl 2,6-dimethyl-4-butyramidothiolo-benzoate,

β-Diethylaminoethyl 2,6-dimethyl-4-p-toluenesulfon-amidothiolobenzoate,

β-Diethylaminoethyl 2,6-dimethyl-4-benzenesulfonamido-thiolobenzoate,

β-Diethylaminoethyl 2,6-dimethyl-4-benzamidothiolo-benzoate, and the like.

Following the procedure described in Example 13 except for the replacement of β-diethylaminoethylamine by β-diethylaminoethyl mercaptan and the substitution of 2,6-dimethyl-4-acetamidobenzoyl chloride by other hindered 4-acylamidobenzoyl halides, other hindered 4-acylamidothiolobenzoic acid esters are obtained such as:

β-Diethylaminoethyl 2-methyl-4-acetamidothiolobenzoate,

β-Diethylaminoethyl 2-ethyl-3,6-dimethyl-4-propionami-dothiolobenzoate,

β-Diethylaminoethyl 2,6-diethyl-4-acetamidothioloben-zoate,

β-Diethylaminoethyl 2-methyl-6-(2-furyl)-4-butyramido-thiolobenzoate,

β-Diethylaminoethyl 2-methyl-6-p-methoxyphenethyl-4-acetamidothiolobenzoate,

β-Diethylaminoethyl 2,6-diphenyl-4-acetamidothiolo-benzoate,

β-Diethylaminoethyl 2-methyl-6-cyclohexyl-4-acetamido-thiolobenzoate,

β-Diethylaminoethyl 2-methyl-3-p-methoxyphenethyl-4-acetamidothiolobenzoate,

β-Diethylaminoethyl 2-methyl-6-n-hexy-4-acetamido-thiolobenzoate,

β-Diethylaminoethyl 2-methyl-6-isopropyl-4-propionami-dothiolobenzoate,

β-Diethylaminoethyl 2-methyl-6-p-methoxyphenethyl-4-butyramidothiolobenziate,

β-Diethylaminoethyl 2,6-diethyl-4-isobutyramidothiolo-benzoate,

β-Diethylaminoethyl 2-methyl-6-o-methoxybenzyl-4-acetamidothiolobenzoate,

β-Diethylaminoethyl 2-methyl-6-benzyl-4-acetamido-thiolobenzoate,

β-Diethylaminoethyl 2-ethyl-4-acetamidothiolobenzoate,

β-Diethylaminoethyl 2-n-butyl-4-acetamidothioloben-zoate,

β-Diethylaminoethyl 2-methyl-6-p-tolyl-4-acetamido-thiolobenzoate,

β-Diethylaminoethyl 2-methyl-3-(3,7-dimethyloctyl)-4-acetamidothiolobenzoate,

β-Diethylaminoethyl 2,3-dimethyl-4-acetamidothiolo-benzoate,

β-Diethylaminoethyl 2-methyl-3-m-methoxyphenethyl-4-acetamidothiolobenzoate,

β-Diethylaminoethyl 2,6-dimethyl-3-ethyl-4-acetamido-thiolobenzoate,

β-Diethylaminoethyl 2-methyl-3-benzyl-6-isopropyl-4-acetamidothiolobenzoate, and the like.

*Example 21.—N-β-Diethylaminoethyl-2,6-Dimethyl-4-Aminobenzamide*

In a two-liter, one-neck flask fitted with a reflux condenser are placed the N-β-diethylaminoethyl-2,6-dimethyl-4-acetamidobenzamide obtained in Example 13, forty grams of sodium hydroxide, 125 milliliters of water and 500 milliliters of ethyl alcohol. The mixture is refluxed for three hours and then allowed to cool at room temperature overnight. The alcohol and water mixture is evaporated under vacuum on a steam bath and the solid residue thus obtained is extracted with ether. The ether extract is filtered, dried and then distilled. The fraction boiling between 185 and 190 degrees centigrade at 0.02 millimeter pressure is collected and identified as N-β-diethylaminoethyl-2,6-dimethyl-4-aminobenzamide.

On heating a benzene solution of N-β-diethylamino-ethyl-2,6-dimethyl-4-aminobenzamide and methyl bromide and cooling and concentrating the resulting solution, N - β - diethylaminoethyl-2,6-dimethyl-4-aminobenz-amide methobromide is obtained.

Similarly, by reacting N-β-diethylaminoethyl-2,6-di-methyl-4-aminobenzamide with other esters such as ethyl chloride, benzyl chloride, and the like, the corresponding quaternary ammonium salts of N-β-diethylamino-ethyl-2,6-dimethyl-4-aminobenzamide are obtained such as, for example, N-β-diethylaminoethyl-2,6-dimethyl-4-aminobenzamide ethochloride, N-β-diethylaminoethyl-2,6-dimethyl-4-aminobenzamide benzyl chloride, and the like.

On reacting N - β-diethylaminoethyl-2,6-dimethyl-4-aminobenzamide with a suitable acid such as sulfuric acid, acetic acid, benzoic acid, or the like, in alcohol, the corresponding acid addition salt of N-β-diethylamino-ethyl-2,6-dimethyl-4-aminobenzamide is obtained such as N - β-diethylaminoethyl-2,6-dimethyl-4-aminobenzamide sulfate, N-β-diethylaminoethyl-2,6-dimethyl-4-aminobenz-amide acetate, N - β - diethylaminoethyl-2,6-dimethyl-4-aminobenzamide benzoate, and the like.

*Example 22.—N-β-Diethylaminoethyl-2-Methyl-6-Ethyl-4-Aminobenzamide*

Following the procedure described in Example 21 except for the substitution of N-β-diethylaminoethyl-2,6-dimethyl-4-acetamidobenzamide by N-β-diethylaminoeth-yl-2-methyl-6-ethyl-4-acetamidobenzamide (Example 14), N - β - diethylaminoethyl-2-methyl-6-ethyl-4-aminobenz-amide is obtained.

*Example 23.—N-β-Diethylaminoethyl-2-Methyl-6-Isopropyl-4-Aminobenzamide*

Following the procedure described in Example 21 except for the substitution of N-β-diethylaminoethyl-2,6-dimethyl-4-acetamidobenzamide by N-β-diethylaminoeth-yl-2-methyl-6-isopropyl-4-acetamidobenzamide (Example 15), N-β-diethylaminoethyl-2-methyl-6-isopropyl-4-ami-nobenzamide is obtained.

Following the procedure described in Example 21 except for the replacement of N-β-diethylaminoethyl-2,6-di-methyl-4-acetamidobenzamide by other N-secondary-ami-noalkyl-2,6-dimethyl-4-acetamidobenzamides, other N-secondary - aminoalkyl-2,6-dimethyl-4-aminobenzamides, including their acid addition and quaternary ammonium salts, are obtained. Thus, on hydrolyzing N-diethylami-nomethyl-2,6-dimethyl-4-acetamidobenzamide, N-diethyl-aminomethyl-2,6-dimethyl-4-aminobenzamide is obtained. In a like manner, N-zeta-diethylaminohexyl-2,6-dimethyl-4-aminobenzamide is obtained by hydrolyzing N-zeta-di-ethylaminohexyl-2,6-dimethyl-4-acetamidobenzamide; N-β - methylcyclohexylaminoethyl - 2,6-dimethyl-4-amino-benzamide is obtained by hydrolyzing N-β-methylcyclo-hexylaminoethyl-2,6-dimethyl-4-acetamidobenzamide; N-methyl-N-β-diethylaminoethyl-2,6-dimethyl-4-aminobenz-amide is obtained by hydrolyzing N-methyl-N-β-diethyl-aminoethyl - 2,6 - dimethyl-4-acetamidobenzamide; N-(β-methylcyclohexylaminoethyl) - N - ethyl-2,6-dimethyl-4-aminobenzamide is obtained by hydrolyzing N-(β-meth-ylcyclohexylaminoethyl) - N - ethyl - 2,6 - dimethyl-4-ac-etamidobenzamide; N-β-(1-pyrrolidyl)ethyl-2,6-dimethyl-4-aminobenzamide is obtained by hydrolyzing N-β-(1-pyrrolidyl)ethyl-2,6-dimethyl-4-acetamidobenzamide; N-

β - (2,2 - dimethyl-1-pyrrolidyl)ethyl-2,6-dimethyl-4-aminobenzamide is obtained by hydrolyzing N-β-(2,2-dimethyl - 1 - pyrrolidyl)ethyl - 2,6 - dimethyl-4-acetamidobenzamide; N - β-(1-piperidyl)ethyl-2,6-dimethyl-4-aminobenzamide is obtained by hydrolyzing N-β-(1-piperidyl-ethyl-2,6 - dimethyl-4-acetamidobenzamide; N-β-(2-methyl-1-piperidyl)ethyl - 2,6 - dimethyl-4-aminobenzamide is obtained by hydrolyzing N-β-(2-methyl-1-piperidyl)ethyl-2,6 - dimethyl - 4-acetamidobenzamide; N-butyl-N-γ-(1-piperidyl)propyl-2,6-dimethyl-4-aminobenzamide is obtained by hydrolyzing N-butyl-N-γ-(1-piperidyl)propyl-2,6-dimethyl-4-acetamidobenzamide; N-β-(4-morpholinyl) ethyl-2,6-dimethyl-4-aminobenzamide is obtained by hydrolyzing N-β-(4-morpholinyl)ethyl-2,6-dimethyl-4-acetamidobenzamide; N-β-(2-methyl-4-morpholinyl)ethyl-2,6-dimethyl-4-aminobenzamide is obtained by hydrolyzing N-β-(2-methyl-4-morpholinyl)ethyl - 2,6 - dimethyl-4-acetamidobenzamide; and N-β-methylethylaminoethyl-2,6-dimethyl-4-aminobenzamide is obtained by hydrolyzing N-β - methylethylaminoethyl-2,6-dimethyl-4-acetamidobenzamide.

Following the procedure described in Example 21 except for the substitution of N-β-diethylaminoethyl-2,6-dimethyl-4-acetamidobenzamide by other hindered 4-acylamidobenzamides, the following hindered 4-aminobenzamides, including their acid addition and quaternary ammonium salts, are obtained:

N-β-diethylaminoethyl-2-methyl-4-aminobenzamide,
N-β-diethylaminoethyl-2-ethyl-3,6-dimethyl-4-aminobenzamide,
N-β-diethylaminoethyl-2,6-diethyl-4-aminobenzamide,
N-β-diethylaminoethyl-2-methyl-6-(2-furyl)-4-aminobenzamide,
N-β-diethylaminoethyl-2-methyl-6-p-methoxyphenethyl-4-aminobenzamide,
N-β-diethylaminoethyl-2,6-diphenyl-4-aminobenzamide,
N-β-diethylaminoethyl-2-methyl-6-cyclohexyl-4-aminobenzamide,
N-β-diethylaminoethyl-2-methyl-3-p-methoxypenethyl-4-aminobenzamide,
N-β-diethylaminoethyl-2-methyl-6-n-hexyl-4-aminobenzamide,
N-β-diethylaminoethyl-2-methyl-6-isopropyl-4-aminobenzamide,
N-β-diethylaminoethyl-2-methyl-6-p-methoxyphenethyl-4-aminobenzamide,
N-β-diethylaminoethyl-2,6-diethyl-4-aminobenzamide,
N-β-diethylaminoethyl-2-methyl-6-o-methylbenzyl-4-aminobenzamide,
N-β-diethylaminoethyl-2-methyl-6-benzyl-4-aminobenzamide,
N-β-diethylaminoethyl-2-ethyl-4-aminobenzamide,
N-β-diethylaminoethyl-2-n-butyl-4-aminobenzamide,
N-β-diethylaminoethyl-2-methyl-6-p-tolyl-4-aminobenzamide,
N-β-diethylaminoethyl-2-methyl-3-(3,7-dimethyloctyl)-4-aminobenzamide,
N-β-diethylaminoethyl-2,3-dimethyl-4-aminobenzamide,
N-β-diethylaminoethyl-2-methyl-3-m-methoxyphenethyl-4-aminobenzamide,
N-β-diethylaminoethyl-2,6-dimethyl-3-ethyl-4-aminobenzamide,
N-β-diethylaminoethyl-2-methyl-3-benzyl-6-isopropyl-4-aminobenzamide, and the like.

Where arylsulfonyl halides, aroyl halides, and the like, have been used as acylating agents to form the aforementioned N - β-diethylaminoethyl-2,6-dimethyl-4-p-toluenesulfonamidobenzamide, N - β-diethylaminoethyl-2,6-dimethyl-4-benzenesulfonamidobenzamide, N-β-diethylaminoethyl - 2,6-dimethyl-4-benzamidobenzamide, and the like, these compounds are hydrolyzed to the corresponding hindered 4-aminobenzamide by reaction with a mixture of hydrogen bromide and phenol in an acetic acid medium, in the manner set forth in U. S. Patent 2,562,222.

The novel hindered 4-aminobenzamides of the invention, their acid addition and quaternary ammonium salts, are characterized by pharmacological activity, and more specifically, local anesthetic activity.

*Example 24.—β-Diethylaminoethyl 2,6-Dimethyl-4-Aminobenzoate*

In a 500-milliliter, one-neck flask fitted with a reflux condenser are placed 26 grams (0.085 mole) of β-diethylaminoethyl 2,6-dimethyl-4-acetamidobenzoate (Example 16), 22 grams of sodium hydroxide, fifty milliliters of water and 200 milliliters of ethyl alcohol. The mixture is refluxed for four hours at a temperature of 95 degrees centigrade and then 200 milliliters of solvent is removed by distillation. The residue is cooled to twenty degrees centigrade, 300 milliliters of water added thereto and the resulting solution is extracted with ether. The ether extract is filtered, dried and then distilled. There is obtained a light brown oil, identified by infrared analysis as β-diethylaminoethyl 2,6-dimethyl-4-aminobenzoate boiling between 155 and 157 degrees centigrade at a pressure of 0.04 millimeter of mercury and possessing an index of refraction $n_D^{25}=1.5477$.

*Analysis.*—Calculated for $C_{15}H_{24}N_2O_2$: N, 10.60. Found: N, 10.49.

By heating a benzene solution of β-diethylaminoethyl 2,6-dimethyl-4-aminobenzoate and methyl bromide and cooling and concentrating the resulting solution, β-diethylaminoethyl 2,6-dimethyl-4-aminobenzoate methobromide is obtained.

Similarly, by reacting β-diethylaminoethyl 2,6-dimethyl-4-aminobenzoate with other esters such as, for example, ethyl chloride, benzyl chloride, and the like, the corresponding quaternary ammonium salts of β-diethylaminoethyl 2,6-dimethyl-4-aminobenzoate are obtained such as, for example, β-diethylaminoethyl 2,6-dimethyl-4-aminobenzoate ethochloride, β-diethylaminoethyl 2,6-dimethyl-4-aminobenzoate benzyl chloride, and the like.

*Example 25.—β-Diethylaminoethyl 2,6-Dimethyl-4-Aminobenzoate Monohydrochloride*

One gram of β-diethylaminoethyl 2,6-dimethyl-4-aminobenzoate (Example 24) is dissolved in thirty milliliters of diethyl ether and gaseous hydrogen chloride is bubbled into the solution until the precipitation of white solid ceases. The solid material is collected by filtration, immediately dissolved in isopropanol and then recrystallized therefrom. β-Diethylaminoethyl 2,6-dimethyl-4-aminobenzoate monohydrochloride is thus obtained melting between 129 and 130 degrees centigrade.

*Analysis.*—Calculated for $C_{15}H_{25}ClN_2O_2$: Cl, 11.79. Found: Cl, 11.67.

*Example 26.—β-Diethylaminoethyl 2,6-Dimethyl-4-Aminobenzoate Dihydrochloride*

One gram of β-diethylaminoethyl 2,6-dimethyl-4-aminobenzoate (Example 24) is dissolved in thirty milliliters of diethyl ether and gaseous hydrogen chloride is bubbled into the solution until the precipitation of white solid ceases. The solid material is collected by filtration and exposed to the air. Over a period of eight hours, the white solid material becomes gummy, light tan in color and then resolidifies. Upon recrystallization from isopropanol, white crystalline β-diethylaminoethyl 2,6-dimethyl-4-aminobenzoate dihydrochloride is obtained melting between 194 and 194.5 degrees centigrade.

*Analysis.*—Calc. for $C_{15}H_{26}Cl_2N_2O_2$: Cl, 21.07; N, 8.32. Found: Cl, 20.61; N, 8.28.

*Example 27.—β-Diethylaminoethyl 2,6-Dimethyl-4-Aminobenzoate Citrate*

Following the procedure set forth in Example 25 except for the replacement of hydrogen chloride by citric acid, β-diethylaminoethyl 2,6-dimethyl-4-aminobenzoate citrate is obtained in the form of colorless crystals.

Example 28.—β-1-Piperidylethyl 2,6-Dimethyl-4-Aminobenzoate

Following the procedure described in Example 24 except for the substitution of β-diethylaminoethyl 2,6-dimethyl-4-acetamidobenzoate by β-1-piperidylethyl 2,6-dimethyl-4-acetamidobenzoate (Example 18), there is obtained a forty percent yield of β-1-piperidylethyl 2,6-dimethyl-4-aminobenzoate boiling between 175 and 180 degrees centigrade at a pressure of 0.03 millimeter of mercury.

Example 29.—β-1-Piperidylethyl 2,6-Dimethyl-4-Aminobenzoate Dihydrochloride

Following the procedure described in Example 26 except for the substitution of β-diethylaminoethyl 2,6-dimethyl-4-aminobenzoate by β-1-piperidylethyl 2,6-dimethyl-4-aminobenzoate (Example 28), there is obtained β-1-piperidylethyl 2,6-dimethyl-4-aminobenzoate dihydrochloride melting between 223 and 225 degrees centigrade (tube).

Analysis.—Calc. for $C_{16}H_{26}Cl_2N_2O_2$: C, 55.01; H, 7.50; N, 8.02; Cl, 20.21. Found: C, 55.35; H, 7.64; N, 8.19; Cl, 19.83.

Example 30.—β-4-Morpholinylethyl 2,6-Dimethyl-4-Aminobenzoate

Following the procedure described in Example 24 except for the substitution of β-diethylaminoethyl 2,6-dimethyl-4-acetamidobenzoate by β-4-morpholinylethyl 2,6-dimethyl-4-acetamidobenzoate (Example 17), β-4-morpholinylethyl 2,6-dimethyl-4-aminobenzoate is obtained.

Example 31.—β-Diethylaminoethyl 2-Methyl-6-Ethyl-4-Aminobenzoate

Following the procedure described in Example 24 except for the replacement of β-diethylaminoethyl 2,6-dimethyl-4-acetamidobenzoate by β-diethylaminoethyl 2-methyl-6-ethyl-4-acetamidobenzoate (Example 19), β-diethylaminoethyl 2-methyl-6-ethyl-4-aminobenzoate is obtained.

Example 32.—β-Diethylaminoethyl 2-Methyl-6-Isopropyl-4-Aminobenzoate

Following the procedure described in Example 24 except for the substitution of β-diethylaminoethyl 2,6-dimethyl-4-acetamidobenzoate by β-diethylaminoethyl 2-methyl-6-isopropyl-4-acetamidobenzoate (Example 20), β-diethylaminoethyl 2-methyl-6-isopropyl-4-aminobenzoate is obtained.

In the same manner, hindered 4-acylamidobenzoic acid esters are hydrolyzed by the procedure described in Example 24 to form the corresponding hindered 4-aminobenzoic acid esters. Thus, zeta-diethylaminohexyl 2,6-dimethyl-4-aminobenzoate is obtained by the hydrolysis of zeta-diethylaminohexyl 2,6-dimethyl-4-acetamidobenzoate; β-methylethylaminoethyl 2,6-dimethyl-4-aminobenzoate is obtained by the hydrolysis of β-methylethylaminoethyl 2,6-dimethyl-4-acetamidobenzoate; β-dicyclohexylaminoethyl 2,6-dimethyl-4-aminobenzoate is obtained by the hydrolysis of β-dicyclohexylaminoethyl 2,6-dimethyl-4-acetamidobenzoate; β-1-pyrrolidylethyl 2,6-dimethyl-4-aminobenzoate is obtained by the hydrolysis of β-1-pyrrolidylethyl 2,6-dimethyl-4-acetamidobenzoate.

Similarly, the following hindered 4-aminobenzoic acid esters are obtained by hydrolysis of the corresponding hindered 4-acylamidobenzoic acid esters:

β-Ethylbenzylaminoethyl 2,6-dimethyl-4-aminobenzoate,
β-Dibenzylaminoethyl 2,6-Dimethyl-4-aminobenzoate,
β-(2-methyl-1-pyrrolidyl)ethyl 2,6-dimethyl-4-aminobenzoate,
β-(2-methyl-1-piperidyl)ethyl 2,6-dimethyl-4-aminobenzoate,
β-(2-methyl-4-morpholinyl)ethyl 2,6-dimethyl-4-aminobenzoate,
β-Dimethylaminoethyl 2-methyl-4-aminobenzoate,
β-Diethylaminoethyl 2-ethyl-3,6-dimethyl-4-aminobenzoate,
β-Diethylaminoethyl 2,6-diethyl-4-aminobenzoate,
β-Diethylaminoethyl 2-methyl-6-(2-furyl)-4-aminobenzoate,
β-Diethylaminoethyl 2-methyl-6-p-methoxyphenethyl-4-aminobenzoate,
β-Diethylaminoethyl 2,6-diphenyl-4-aminobenzoate,
β-Diethylaminoethyl 2-methyl-6-cyclohexyl-4-aminobenzoate,
β-Diethylaminoethyl 2-methyl-3-p-methoxyphenethyl-4-aminobenzoate,
βDiethylaminoethyl 2-methyl-6-n-hexyl-4-aminobenzoate,
β-Dimethylaminopropyl 2-methyl-6-n-propyl-4-aminobenzoate,
β-Dimethylaminoisopropyl 2-methyl-6-n-propyl-4-aminobenzoate,
γ-Dimethylaminopropyl 2-methyl-6-n-propyl-4-aminobenzoate,
β-Diethylaminoethyl 2-methyl-6-o-methylbenzyl-4-aminobenzoate,
β-Diethylaminoethyl 2-methyl-6-benzyl-4-aminobenzoate,
β-Diethylaminoethyl 2-ethyl-4-aminobenzoate,
β-Diethylaminoethyl 2-n-butyl-4-aminobenzoate,
β-Diethylaminoethyl 2-methyl-6-p-tolyl-4-aminobenzoate,
β-Diethylaminoethyl 2-methyl-3-(3,7-Dimethyloctyl)-4-aminobenzoate,
β-Diethylaminoethyl 2,3-dimethyl-4-aminobenzoate,
β-Diethylaminoethyl 2-methyl-3-m-methoxyphenethyl-4-aminobenzoate,
β-Diethylaminoethyl 2,6-dimethyl-3-ethyl-4-aminobenzoate,
β-Diethylaminoethyl 2-methyl-3-benzyl-6-isopropyl-4-aminobenzoate, and the like.

Where arylsulfonyl halides, aroyl halides, and the like, have been used as acylating agents to form the aforementioned β-diethylaminoethyl 2,6-dimethyl-4-p-toluenesulfonamidobenzoate, β-diethylaminoethyl 2,6-dimethyl-4-benzenesulfonamidobenzoate, β-diethylaminoethyl 2,6-dimethyl-4-benzamidobenzoate, and the like, these compounds are hydrolyzed to the corresponding hindered 4-aminobenzoic acid esters by reaction with a mixture of hydrogen bromide and phenol in an acetic acid medium, in the manner set forth in U.S. Patent 2,562,222.

Similarly, by the procedure set forth in Examples 24 to 27, the acid addition and quaternary ammonium salts of hindered 4-aminobenzoic acid esters are likewise obtained.

The novel hindered 4-aminobenzoic acid esters, their acid addition and quaternary ammonium salts, are characterized by pharmacological activity, and more specifically, local anesthetic activity.

Following the procedure described in Example 24, hindered 4-acylamidothiolobenzoic acid esters are hydrolyzed to the corresponding hindered 4-aminothiolobenzoic acid esters. Thus, for example, β-diethylaminoethyl 2,6-dimethyl-4-acetamidothiolobenzoate is hydrolyzed to β-diethylaminoethyl 2,6-dimethyl-4-aminothiolobenzoate. In a like manner, zeta-diethylaminohexyl 2,6-dimethyl-4-aminothiolobenzoate is obtained by the hydrolysis of zeta-diethylaminohexyl 2,6-dimethyl-4-acetamidothiolobenzoate; β-methylethylaminoethyl 2,6-dimethyl-4-aminothiolobenzoate is obtained by the hydrolysis of β-methylethylaminoethyl 2,6-dimethyl-4-acetamidothiolobenzoate; β-dicyclohexylaminoethyl 2,6-dimethyl-4-aminothiolobenzoate is obtained by the hydrolysis of β-dicyclohexylaminoethyl 2,6-dimethyl-4-acetamidothiolobenzoate; β-1-pyrrolidylethyl 2,6-dimethyl-4-aminothiolobenzoate is obtained by the hydrolysis of β-1-pyrrolidylethyl 2,6-dimethyl-4-acetamidothiolobenzoate, β-1-piperidylethyl 2,6-dimethyl-4-aminothiolobenzoate is obtained by the hydrolysis of β-1-piperidylethyl 2,6-dimethyl-4-acetamidothiolobenzoate; and β-4-morpholinylethyl 2,6- dimethyl-4-aminothiolobenzoate is obtained by the hydrolysis of β-4-morpholinylethyl 2,6-dimethyl-4-acetamidothiolobenzoate.

By the same procedure, the following hindered 4-aminothiolobenzoic acid esters are obtained from the corresponding hindered 4-acylamidothiolobenzoic acid esters:

β-Ethylbenzylaminoethyl 2,6-dimethyl-4-aminothiolobenzoate,
β-Dibenzylaminoethyl 2,6-dimethyl-4-aminothiolobenzoate,
β-(2-methyl-1-pyrrolidyl)ethyl 2,6-dimethyl-4-aminothiolobenzoate,
β-(2-methyl-1-piperidyl)ethyl 2,6-dimethyl-4-aminothiolobenzoate,
β-(2-methyl-4-morpholinyl)ethyl 2,6-dimethyl-4-aminothiolobenzoate,
β-Diethylaminoethyl 2-methyl-4-aminothiolobenzoate,
β-Diethylaminoethyl 2-ethyl-3,6-dimethyl-4-aminothiolobenzoate,
β-Diethylaminoethyl 2-methyl-6-(2-furyl)-4-aminothiolobenzoate,
β-Diethylaminoethyl 2-methyl-6-p-methoxyphenethyl-4-aminothiolobenzoate,
β-Diethylaminoethyl 2-methyl-6-cyclohexyl-4-aminothiolobenzoate,
β-Diethylaminoethyl 2-methyl-3-p-methoxyphenethyl-4-aminothiolobenzoate,
β-Diethylaminoethyl 2-methyl-6-n-hexyl-4-aminothiolobenzoate,
β-Diethylaminoethyl 2-methyl-6-isopropyl-4-aminothiolobenzoate,
β-Diethylaminoethyl 2-methyl-6-o-methylbenzyl-4-aminothiolobenzoate,
β-Diethylaminoethyl 2-methyl-6-benzyl-4-aminothiolobenzoate,
β-Diethylaminoethyl 2-ethyl-4-aminothiolobenzoate,
β-Diethylaminoethyl 2-n-butyl-4-aminothiolobenzoate,
β-Diethylaminoethyl 2-methyl-6-p-tolyl-4-aminothiolobenzoate,
β-Diethylaminoethyl 2-methyl-3-(3,7-dimethyloctyl)-4-aminothiolobenzoate,
β-Diethylaminoethyl 2,3-dimethyl-4-aminothiolobenzoate,
β-Diethylaminoethyl 2-methyl-3-m-methoxyphenethyl-4-aminothiolobenzoate,
β-Diethylaminoethyl 2,6-dimethyl-3-ethyl-4-aminothiolobenzoate,
β-Diethylaminoethyl 2-methyl-3-benzyl-6-isopropyl-4-aminothiolobenzoate, and the like.

Similarly, by the procedure set forth in Examples 24 to 27, the acid addition and quaternary ammonium salts of hindered 4-aminothiolobenzoic acid esters are likewise obtained.

Where arylsulfonyl halides, arolyl halides, and the like, have been used as acylating agents to form the aforementioned β-diethylaminoethyl 2,6-dimethyl-4-p-toluenesulfonamidothiolobenzoate, β-diethylaminoethyl 2,6-dimethyl-4-benzenesulfonamidothiolobenzoate, β-diethylaminoethyl 2,6-dimethyl-4-benzamidothiolobenzoate, and the like, these compounds are hydrolyzed to the corresponding hindered 4-aminothiolobenzoic acid esters by reaction with a mixture of hydrogen bromide and phenol in an acetic acid medium in the manner set forth in U.S. Patent 2,562,222.

The novel hindered 4-aminothiolobenzoic acid esters, their acid addition and quaternary ammonium salts, are characterized by pharmacological activity, and more specifically, local anesthetic activity.

It is to be understood that the invention is not to be limited to the exact details of operation or exact compounds shown and described herein, as obvious modifications and equivalents will be apparent to one skilled in the art. The invention is therefore to be limited only by the scope of the appended claims.

I claim:
1. A process for preparing compounds of the formula:

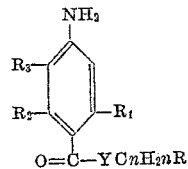

wherein $n$ is an integer from one to six inclusive, R is a secondary-amino radical, $R_1$ is a member selected from the group consisting of hydrogen and alkyl, cycloalkyl, aralkyl, aryl and heterocyclic radicals; $R_2$ is a member selected from the group consisting of alkyl and aryl radicals; $R_3$ is a member selected from the group consisting of hydrogen and alkyl and aralkyl radicals; and Y is a member selected from the group consisting of oxygen, sulfur, imino, and alkylimino; which comprises subjecting a hindered 4-oxo-2-cyclohexene-1-carboxylic acid ester of the formula:

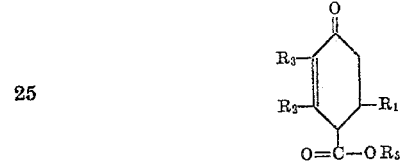

wherein $R_5$ is a member selected from the group consisting of alkyl and aralkyl radicals, and $R_1$, $R_2$ and $R_3$ are as defined above, to oximation, aromatizing and acylating the resulting hindered 4-oximino-2-cyclohexene-1-carboxylic acid ester, hydrolyzing the hindered 4-acylamidobenzoic acid ester thus obtained followed by acylation to form a hindered 4-acylamidobenzoic acid, reacting said acid with an inorganic acid halide, reacting the hindered 4-acylamidobenzoyl halide thus obtained with a compound of the formula:

$$HYCnH_2nR$$

wherein Y, R and $n$ are as defined above, and then hydrolyzing the compound thus obtained.

2. A process for preparing compounds of the formula:

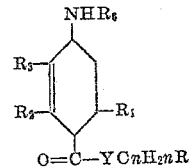

wherein $R_6$ is an acyl group, and $n$, R, $R_1$, $R_2$, $R_3$ and Y are as defined in claim 1, which comprises subjecting a hindered 4-oxo-2-cyclohexene-1-carboxylic acid ester of the formula:

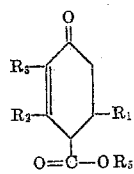

wherein $R_1$, $R_2$, $R_3$ and $R_5$ are as defined in claim 1, to oximation, aromatizing and acylating the resulting hindered 4-oximino-2-cyclohexene-1-carboxylic acid ester, hydrolyzing the hindered 4-acylamidobenzoic acid ester thus obtained following by acylation to form a hindered 4-acylamidobenzoic acid, reacting said acid with an inorganic acid halide and then reacting the hindered 4-acylamidobenzoyl halide thus obtained with a compound of the formula:

$$HYCnH_2nR$$

wherein Y, R and $n$ are as defined in claim 1.

(References on following page)

References Cited in the file of this patent

UNITED STATES PATENTS

| | | |
|---|---|---|
| 2,073,100 | Eisleb | Mar. 9, 1937 |
| 2,342,142 | Harris et al. | Feb. 22, 1944 |
| 2,821,540 | Speeter et al. | Jan. 28, 1958 |

OTHER REFERENCES

Grob: Helvetica Chimica Acta, volume 33, pages 1787–96, abstracted in Chem. Abstracts, volume 45, column 3804(f), 1950.

Rhodehamel: Jour. of the American Chem. Soc., volume 73, page 5902, abstracted in Chem. Abstracts, volume 46, column 11181(b) (1951).

Dvoretsky et al.: Jour. of Org. Chem., volume 18, pages 615–19, June 16, 1952.

Tetracaine: Merck Index, Sixth Edition, p. 939 (1952).